United States Patent
Maruyama et al.

(10) Patent No.: US 10,920,655 B2
(45) Date of Patent: Feb. 16, 2021

(54) CONTROL DEVICE FOR COMPRESSION IGNITION ENGINE

(71) Applicant: Mazda Motor Corporation, Hiroshima (JP)

(72) Inventors: Keiji Maruyama, Aki-gun (JP); Takuya Ohura, Aki-gun (JP); Masanari Sueoka, Aki-gun (JP); Tatsuhiro Tokunaga, Aki-gun (JP); Toru Miyamoto, Aki-gun (JP); Tomohiro Nishida, Aki-gun (JP)

(73) Assignee: Mazda Motor Corporation, Hiroshima (JP)

( * ) Notice: Subject to any disclaimer, the term of this patent is extended or adjusted under 35 U.S.C. 154(b) by 0 days.

(21) Appl. No.: 16/775,562

(22) Filed: Jan. 29, 2020

(65) Prior Publication Data

US 2020/0332704 A1 Oct. 22, 2020

(30) Foreign Application Priority Data

Apr. 19, 2019 (JP) .................................. 2019-080366

(51) Int. Cl.
*F02D 41/40* (2006.01)
*F02B 11/00* (2006.01)
(Continued)

(52) U.S. Cl.
CPC ................ *F02B 11/00* (2013.01); *F02D 9/08* (2013.01); *F02D 37/02* (2013.01); *F02D 41/0002* (2013.01); *F02D 41/401* (2013.01); *F02D 41/402* (2013.01); *F02M 61/14* (2013.01); *F02D 2041/389* (2013.01); *F02D 2200/021* (2013.01)

(58) Field of Classification Search
CPC .. F02D 41/06; F02D 41/1475; F02D 41/0002; F02D 41/401; F02D 41/402; F02D 41/064; F02D 41/3041; F02D 37/02; F02D 9/08; F02D 2041/389; F02D 2200/021; F02B 11/00; F02M 61/14
USPC .......... 123/305, 399, 435, 436, 443, 406.55, 123/685; 701/103–105, 113
See application file for complete search history.

(56) References Cited

U.S. PATENT DOCUMENTS

| 10,648,422 B2 * | 5/2020 | Inoue ................... F02D 41/3041 |
| 10,677,185 B2 * | 6/2020 | Inoue ...................... F02D 23/02 |
| 2019/0107040 A1 | 4/2019 | Tsumura |

FOREIGN PATENT DOCUMENTS

JP 2018084183 A 5/2018

* cited by examiner

*Primary Examiner* — Hai H Huynh
(74) *Attorney, Agent, or Firm* — Alleman Hall Creasman & Tuttle LLP

(57) ABSTRACT

A control device is provided for an engine in which SPCCI combustion is carried out in which SI combustion of a portion of a mixture gas is performed by jump-spark ignition, and CI combustion of the remaining mixture gas is performed by self-ignition. When the engine is low load and a temperature is less than a given value, an early injection in which fuel is injected during an intake stroke and a retarded injection in which fuel is injected during the second half of a compression stroke are performed, and SPCCI combustion of A/F-lean mixture gas is performed. When the engine is low load and the temperature is greater than or equal to the given value, an injection amount ratio of the early injection is increased and the ratio of the retarded injection is decreased, and SPCCI combustion of A/F-lean mixture gas is performed.

7 Claims, 9 Drawing Sheets

(51) Int. Cl.
*F02D 9/08* (2006.01)
*F02D 37/02* (2006.01)
*F02D 41/00* (2006.01)
*F02M 61/14* (2006.01)
*F02D 41/38* (2006.01)

CONTROL DEVICE FOR COMPRESSION IGNITION ENGINE

TECHNICAL FIELD

The present disclosure relates to a device which controls an engine capable of carrying out partial compression ignition combustion in which spark ignition (SI) combustion of a portion of a mixture gas is performed by a jump-spark ignition, and compression ignition (CI) combustion of the remaining mixture gas is performed by a self-ignition.

BACKGROUND OF THE DISCLOSURE

In recent years, Homogeneous-Charge Compression Ignition (HCCI) combustion in which a gasoline fuel mixed with air is combusted inside a combustion chamber by a self-ignition has attracted attention. Since HCCI combustion is a mode in which a mixture gas combusts at a plurality of positions simultaneously, it is said that the combusting rate of the mixture gas is fast, and it is very advantageous in respect of fuel efficiency (thermal efficiency), compared with SI combustion (jump-spark ignition combustion) adopted in normal gasoline engines. However, HCCI combustion has problems such as the combustion start timing of the mixture gas (a timing at which the mixture gas self-ignites) changes largely by external factors such as temperature, and it is difficult to be controlled during a transitional operation in which the load changes suddenly.

Thus, it is proposed that, without combusting all of the mixture gas by the self-ignition, a portion of the mixture gas is combusted by a jump-spark ignition using an ignition plug. That is, the portion of the mixture gas is forcibly combusted by flame propagation which is triggered by the jump-spark ignition (SI combustion), and the remaining mixture gas is combusted by the self-ignition (CI combustion). Below, such combustion is referred to as partial compression ignition combustion.

As one example of the engine which adopts the partial compression ignition combustion, JP2018-084183A is known as follows. In detail, in the engine disclosed in JP2018-084183A, an exhaust gas recirculation (EGR) rate inside a combustion chamber, a timing of jump-spark ignition by an ignition plug, etc. are controlled, during an execution of the partial compression ignition combustion (in this document, it is referred to as "SI-CI combustion"), so that a SI ratio which is a ratio of an amount of heat release caused by SI combustion to the total amount of heat release in one cycle becomes in agreement with a target value (target SI ratio) determined according to the engine load (target torque).

Here, in the engine disclosed in JP2018-084183A, the air-fuel ratio (A/F) inside the combustion chamber is set near a stoichiometric air-fuel ratio (14.7:1) in an operating range where the partial compression ignition combustion is performed. Here, if the air-fuel ratio during the partial compression ignition combustion can be made sufficiently greater than the stoichiometric air-fuel ratio (leaner), it is thought that the engine becomes further advantageous in respect of fuel efficiency. However, since the ignitability of the mixture gas falls under the environment where the air-fuel ratio is greater than the stoichiometric air-fuel ratio (A/F lean environment), there is a problem of being difficult to secure the stability of the partial compression ignition combustion.

SUMMARY OF THE DISCLOSURE

The present disclosure is made in view of the situations, and one purpose thereof is to provide a control device for a compression ignition engine capable of achieving both an improvement in fuel efficiency by making an air-fuel ratio leaner, and securing combustion stability.

In order to solve the problem, the present inventors conducted an experiment in which partial compression ignition combustion of a mixture gas of an air-fuel ratio sufficiently greater than a stoichiometric air-fuel ratio (lean) is carried out under various temperature conditions with different stages of warm-up. In particular, in a situation of an insufficient warm-up (semi-warm-up), the inventors observed that, by injecting fuel not only in an intake stroke but also in the second half of a compression stroke, the mixture gas is stratified, and, by making the mixture gas around an ignition plug relatively rich, combustion stability is improved. Here, since the fuel injection at a retarded timing i.e., in the second half of the compression stroke (hereinafter referred to as a retarded injection) leads to the formation of a locally rich mixture gas, there is a concern that unburned components may increase and fuel efficiency may deteriorate. However, it is discovered from the results of the examination that the fuel efficiency improvement amount due to setting the air-fuel ratio lean exceeds the fuel efficiency degradation amount due to the retarded injection, depending on the temperature conditions, even under the situation with the insufficient warm-up.

According to one aspect of the present disclosure, a control device for an engine including a combustion chamber, an injector configured to inject fuel into the combustion chamber, and an ignition plug configured to ignite a mixture gas where the fuel injected from the injector is mixed with air, is provided. The control device includes an air amount adjusting mechanism, including at least a throttle valve, configured to adjust an amount of air introduced into the combustion chamber, a water temperature sensor configured to acquire a given temperature parameter that increases as a warm-up of the engine progresses, and a processor configured to execute a combustion controlling module to control the injector, the ignition plug, and the air amount adjusting mechanism based on the temperature parameter acquired by the water temperature sensor, and an engine load and an engine speed so that partial compression ignition combustion is carried in which spark ignition (SI) combustion of a portion of the mixture gas is performed out by a jump-spark ignition using the ignition plug, and compression ignition (CI) combustion of the remaining mixture gas is performed by a self-ignition. When a first lean combustion condition in which the engine is operated in a low-load range where the engine load is low and the temperature parameter is below a given value determined beforehand is satisfied, the combustion controlling module causes the injector to perform an early injection in which fuel is injected during an intake stroke, and a retarded injection in which fuel is injected during the second half of a compression stroke, and controls the air amount adjusting mechanism and the ignition plug so that an air-fuel ratio (A/F)-lean mixture gas having an air-fuel ratio greater than a stoichiometric air-fuel ratio is formed inside the combustion chamber, and partial compression ignition combustion of the mixture gas is carried out. When a second lean combustion condition in which the engine is operated in the low-load range and the temperature parameter is the given value or above is satisfied, the combustion controlling module controls the injector so that an injection amount ratio of the early injection increases and the injection amount ratio of the retarded injection decreases, compared with the case when the first lean combustion condition is satisfied, and controls the air amount adjusting mechanism and the ignition plug so that the A/F-lean mixture gas is formed inside the combustion chamber and partial compression ignition combustion of the mixture gas is carried out.

According to this configuration, when the first lean combustion condition is satisfied, i.e., when the A/F-lean partial compression ignition combustion is performed in the situation where the engine temperature is relatively low and the engine load is low, since the retarded injection in the second half of the compression stroke is performed in addition to the early injection in the intake stroke, a stratified mixture gas can be formed inside the combustion chamber so that the mixture gas around the ignition plug becomes relatively rich, and the generation of the flame propagation accompanying the jump-spark ignition of the ignition plug (SI combustion) can be stimulated, thereby stabilizing the partial compression ignition combustion. In addition, since a comparatively large amount of air is introduced into the combustion chamber in order to make the inside of the combustion chamber into A/F lean environment, even if a relatively rich mixture gas is formed around the ignition plug as described above, the air utilization when the rich mixture gas combusts does not drop greatly, thereby preventing the increase in the unburnt component of fuel. Therefore, the fuel efficiency improvement amount caused by making the air-fuel ratio leaner (a drop of the combustion temperature and a drop of the pumping loss caused by this lean air-fuel ratio) exceeds the fuel efficiency degradation amount caused by increasing the unburnt component, thereby improving the substantial fuel efficiency, for example, compared with the case where partial compression ignition combustion of the mixture gas is carried out under the stoichiometric environment where the air-fuel ratio inside the combustion chamber is made near the stoichiometric air-fuel ratio.

On the other hand, when the second lean combustion condition is satisfied, i.e., when the A/F-lean partial compression ignition combustion is carried out in the situation where the engine temperature is relatively high and the engine load is low, since the injection amount ratio of the early injection is increased and the injection amount ratio of the retarded injection is reduced, an unnecessary retarded injection can be avoided from being performed under the situation where the engine temperature is high and the ignitability of the mixture gas is improved, and the stratification of the mixture gas can be weakened while securing combustion stability (it can bring the mixture gas close to homogeneous). Therefore, the clean combustion in which the amount of NOR, etc. is fully reduced can be achieved, while reducing the unburnt component of fuel to effectively improve fuel efficiency.

The combustion controlling module may control the injector so that an injection amount by the retarded injection becomes zero when the second lean combustion condition is satisfied.

According to this configuration, since the injection amount of the retarded injection is reduced to zero (i.e., the retarded injection is suspended) when the second lean combustion condition is satisfied, the unburnt component of fuel can fully be reduced and fuel efficiency can be further improved.

The control device may further include a fuel pressure regulator configured to adjust an injection pressure of fuel from the injector. The combustion controlling module may control the fuel pressure regulator so that the injection pressure of the injector when the first lean combustion condition is satisfied becomes higher than the injection pressure when the second lean combustion condition is satisfied.

According to this configuration, the fuel injected by the retarded injection can fully be atomized when the first lean combustion condition at the relatively low-temperature side is satisfied, and the air utilization can be improved, while stimulating the stratification of mixture gas. Therefore, since the relatively rich mixture gas can be formed around the ignition plug and the generation of the unburnt component can be reduced, both the securing of combustion stability and the improvement in fuel efficiency can be achieved.

The combustion controlling module may control the injector so that the early injection is performed dividedly in a plurality of steps when the first lean combustion condition is satisfied and when the second lean combustion condition is satisfied.

According to this configuration, the distribution of the mixture gas inside the combustion chamber based on the early injection can be weakly stratified which is suitable for partial compression ignition combustion. Moreover, when the first lean combustion condition is satisfied, the fully stratified mixture gas suitable for partial compression ignition combustion under the comparatively low-temperature environment can be formed by the combination of the early injections which are divided into a plurality of steps, and the retarded injection.

When the second lean combustion condition is satisfied, the combustion controlling module may control the injector so that the injection amount ratio of a first fuel injection of the early injection increases and the injection amount ratio of the retarded injection decreases, compared with the case when the first lean combustion condition is satisfied.

According to this configuration, the injection amount ratio can be adjusted so that the distribution of the mixture gas becomes more uniform when the second lean combustion condition at the relatively high temperature side is satisfied, thereby improving fuel efficiency while securing combustion stability.

The first lean combustion condition may be a condition in which the engine is operated in the low-load range, and the temperature parameter is greater than or equal to a first threshold and less than a second threshold. The second lean combustion condition may be a condition in which the engine is operated in the low-load range, and the temperature parameter is greater than or equal to the second threshold and less than a third threshold. When a third lean combustion condition in which the engine is operated in the low-load range, and the temperature parameter is greater than or equal to the third threshold is satisfied, the combustion controlling module may control the injector so that the early injection is performed dividedly in a plurality of steps and the retarded injection is suspended, and control the air amount adjusting mechanism and the ignition plug so that the A/F-lean mixture gas is formed inside the combustion chamber and partial compression ignition combustion of the mixture gas is carried out. When the third lean combustion condition is satisfied, the combustion controlling module may increase the injection amount ratio of the first fuel injection of the early injection, and advance an injection timing of the first fuel injection, compared with when the second lean combustion condition is satisfied.

According to this configuration, when performing the A/F-lean partial compression ignition combustion under the condition of a further higher temperature than the second lean combustion condition (the third lean combustion condition), since the injector is controlled so that the early injection is performed in the plurality of steps and the retarded injection is suspended, the stratification of the mixture gas can be weakened to reduce the generation of the unburnt component, thereby achieving the partial compression ignition combustion which is clean and has high fuel efficiency, similar to the case of the second lean combustion condition.

Especially when the third lean combustion condition is satisfied, since the injection amount ratio the first fuel injection of the early injection is increased and the fuel injection timing of the first fuel injection is advanced, compared with the case when the second lean combustion condition is satisfied, the injection amount ratio and the fuel injection timing can be adjusted so that the distribution of the mixture gas becomes more uniform under the third lean combustion condition where the combustion stability is appropriate because the engine temperature is sufficiently high, thereby further improving fuel efficiency, while securing combustion stability.

When the first lean combustion condition is satisfied, and when the second lean combustion condition is satisfied, the combustion controlling module may cause the ignition plug to perform a main ignition in which a spark is generated near a compression top dead center to start the SI combustion and a preceding ignition in which a spark is generated at a timing earlier than the main ignition. Energy of the preceding ignition may be set lower so that flame propagation of the mixture gas does not occur, and the energy of the main ignition may be set higher so that the flame propagation of the mixture gas does occur.

According to this configuration, since the preceding ignition which generates sparks of lower energy which does not cause flame is performed before the main ignition near a compression top dead center, the fuel can be appropriately modified by the preceding ignition to generate inside the combustion chamber the intermediate product which is high in reactability and contains OH radicals, thereby improving the ignitability and speeding up the combusting rate of the mixture gas. Therefore, since it becomes unnecessary to extremely stratify the mixture gas distribution inside the combustion chamber for securing combustion stability especially under the first lean combustion condition at the low-temperature side, the injection amount ratio of the retarded injection can be reduced, and the increase in the unburnt component resulting from the mixture gas becoming locally rich can be effectively reduced. Moreover, since the given value which is the upper-limit temperature of the first lean combustion condition where the retarded injection is essential (second threshold) can be made a comparatively low value, the temperature condition belonging to the second lean combustion condition where the retarded injection is not essential, i.e., the temperature condition where the clean partial compression ignition combustion is possible with the high fuel efficiency can be expanded, thereby effectively improving fuel efficiency and emission performance of the engine.

DETAILED DESCRIPTION OF THE DISCLOSURE (1) Overall Configuration of Engine

Figure 1:
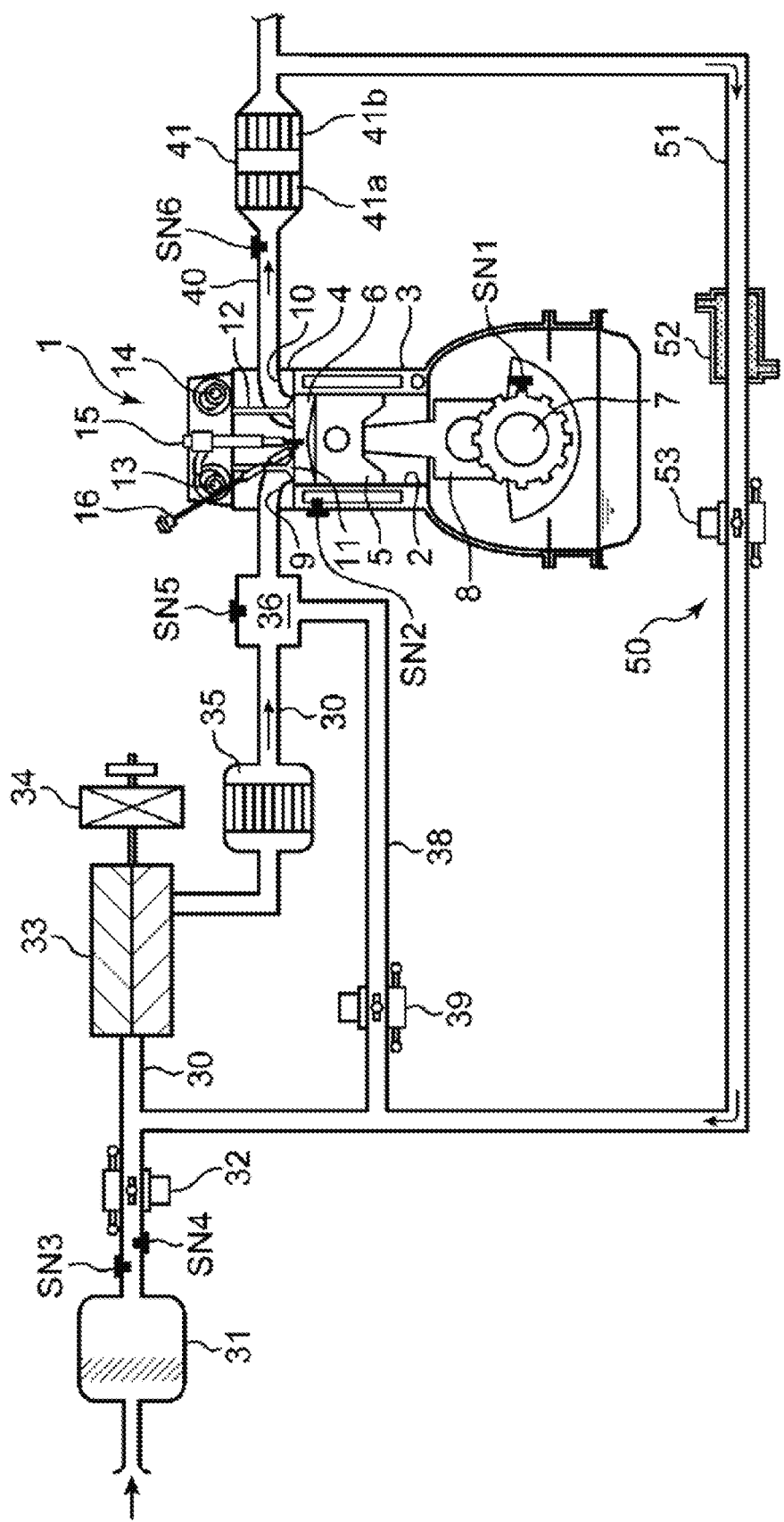
FIG. 1 is a system diagram schematically illustrating the overall configuration of a compression ignition engine according to one embodiment of the present disclosure.
Figure 2:
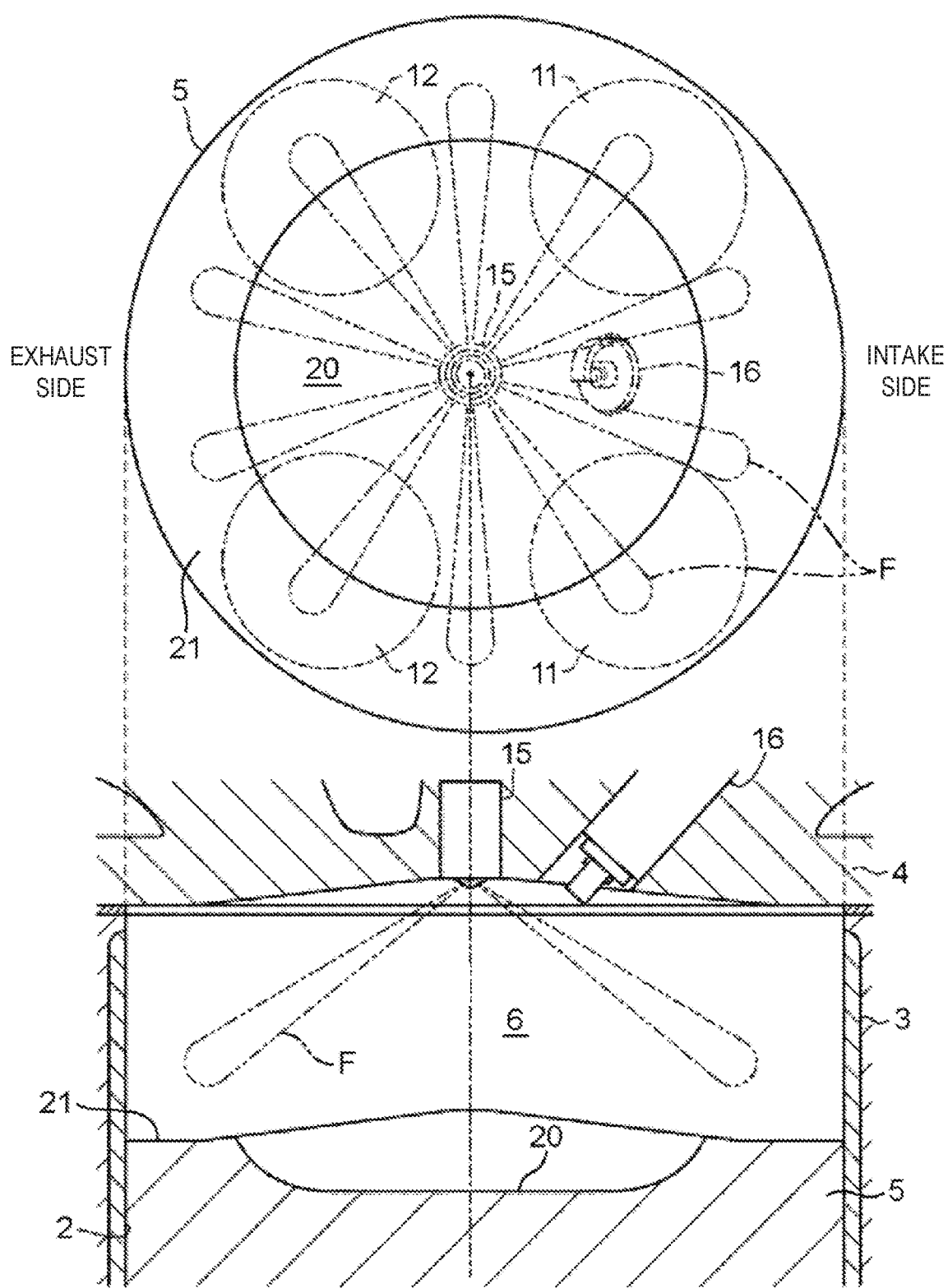
FIG. 2 is a view collectively illustrating a cross-sectional view of an engine body and a plan view of a piston.

FIGS. 1 and 2 are views illustrating a preferable embodiment of a compression ignition engine to which a control device of the present disclosure is applied (hereinafter, simply referred to as "the engine"). The engine illustrated in these figures is a four-cycle gasoline direct-injection engine mounted on the vehicle as a propelling source of the vehicle, and includes an engine body 1, an intake passage 30 where intake air introduced into the engine body 1 circulates, an exhaust passage 40 where exhaust gas discharged from the engine body 1 circulates, and an external exhaust gas recirculation (EGR) device 50 which recirculates a portion of exhaust gas which circulates through the exhaust passage 40 to the intake passage 30.

The engine body 1 has a cylinder block 3 where cylinders 2 are formed therein, a cylinder head 4 attached to an upper surface of the cylinder block 3 so as to cover up the cylinder 2 from above, and pistons 5 reciprocatably inserted in the respective cylinders 2. Although the engine body 1 is typically a multi-cylinder type having a plurality of cylinders (e.g., four), only one of the cylinders 2 is described herein for simplifying the description.

A combustion chamber 6 is defined above the piston 5, and fuel comprised of gasoline as its main component is supplied to the combustion chamber 6 by an injection from an injector 15 (described later). Then, the supplied fuel combusts inside the combustion chamber 6 while being mixed with air, and the expansive force produced by the combustion pushes the piston 5 to make the piston 5 reciprocate in the vertical direction.

Below the piston 5, a crankshaft 7 which is an output shaft of the engine body 1 is provided. The crankshaft 7 is connected with the piston 5 through a connecting rod 8, and is rotated on its center axis by the reciprocating motion (up-and-down motion) of the piston 5.

A geometric compression ratio of the cylinder 2, i.e., a ratio of a volume of the combustion chamber 6 when the piston 5 is at a top dead center to a volume of the combustion chamber 6 when the piston 5 is at a bottom dead center is set to a high compression ratio, 14:1 or higher and 20:1 or lower, and preferably 16:1 or higher and 18:1 or lower, as a suitable value for SPCCI combustion (partial compression ignition combustion) described later.

The cylinder block 3 is provided with a crank angle sensor SN1 which detects a rotational angle of the crankshaft 7 (crank angle) and a rotating speed of the crankshaft 7 (engine speed), and a water temperature sensor SN2 which detects temperature of cooling water which circulates inside the cylinder block 3 and the cylinder head 4 (engine water temperature). The engine water temperature detected by the water temperature sensor SN2 is a parameter which increases as a warm-up of the engine progresses, and is one example of a "temperature parameter" in the present disclosure.

The cylinder head 4 is provided with an intake port 9 for introducing air supplied from the intake passage 30 into the combustion chamber 6, an exhaust port 10 for leading exhaust gas generated inside the combustion chamber 6 to the exhaust passage 40, an intake valve 11 which opens and closes an opening of the intake port 9 at the combustion chamber 6 side, and an exhaust valve 12 which opens and closes an opening of the exhaust port 10 at the combustion chamber 6 side. Note that as illustrated in FIG. 2, the valve type of the engine of this embodiment is a four-valve type having two intake valves and two exhaust valves. That is, in this embodiment, two intake ports 9 and two exhaust ports 10 are opened to the combustion chamber 6 of one cylinder 2, and corresponding to this, two intake valves 11 and two exhaust valves 12 are provided to one cylinder 2.

The intake valve 11 and the exhaust valve 12 are driven by a valve operating mechanism including a pair of cam shafts disposed in the cylinder head 4 to be opened and closed in an interlocked manner with the rotation of the crankshaft 7.

An intake VVT 13 which can change the opening and closing timings of the intake valve 11 is built in the valve operating mechanism for the intake valve 11. Similarly, an exhaust VVT 14 which can change the opening and closing timings of the exhaust valve 12 is built in the valve operating mechanism for the exhaust valve 12. The intake VVT 13 (exhaust VVT 14) is a so-called phase variable mechanism, and changes the open timing and the close timing of the intake valve 11 (exhaust valve 12) simultaneously by the same amount.

Figure 3:
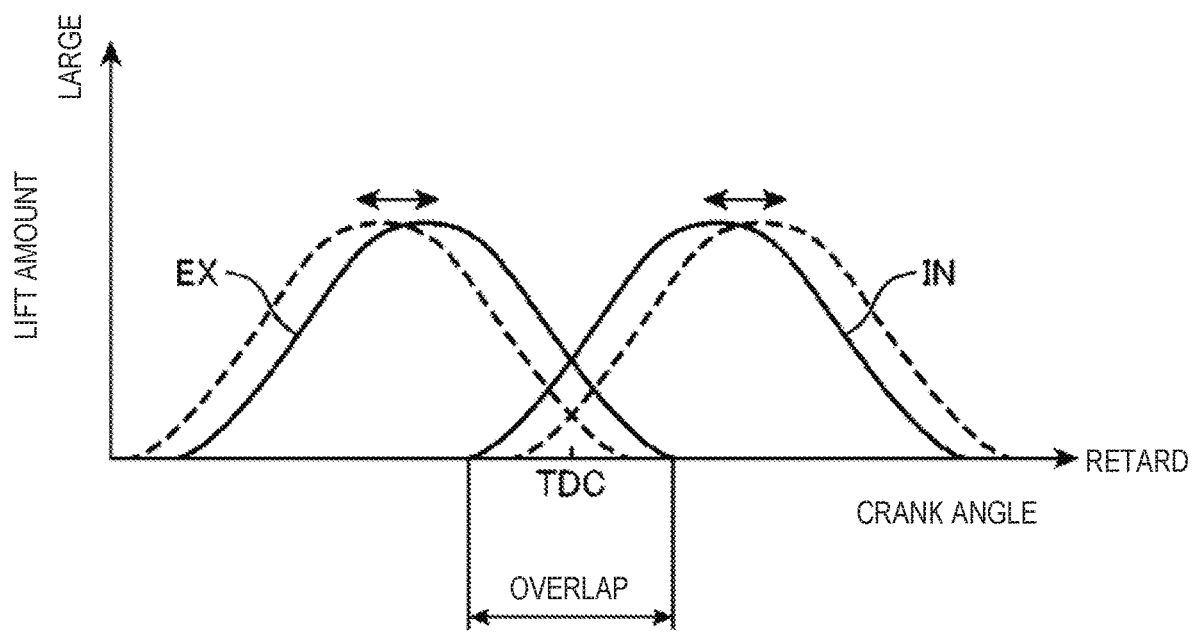
FIG. 3 is a view illustrating lift curves of an intake valve and an exhaust valve.

FIG. 3 is a view illustrating a lift curve of the intake valve 11 and the exhaust valve 12, where "IN" indicates the lift curve of the intake valve 11 and "EX" indicates the lift curve of the exhaust valve 12. As illustrated in this figure, the intake valve 11 and the exhaust valve 12 may be driven so that their valve opening periods overlap with each other, including an exhaust top dead center (TDC in FIG. 3). This overlap period, i.e., a period during which both the intake valve 11 and the exhaust valve 12 open is referred to as a "valve overlap period." The valve overlap period can be adjusted by controlling the intake VVT 13 and the exhaust VVT 14 described above. Waveforms of solid lines in FIG. 3 illustrate a case where the valve overlap period is comparatively lengthened, and in this case, by continuing the opening of the exhaust valve 12 until an early stage of an intake stroke after the exhaust top dead center (TDC), burnt gas (exhaust gas) is drawn back from the exhaust port 10 to the combustion chamber 6 to achieve internal EGR. On the contrary, as illustrated by waveforms of dashed lines, when the valve overlap period is shortened, an amount of the burnt gas drawn back from the exhaust port 10 (remained) as described above decreases, and, as the result, the internal EGR is reduced or suspended.

As illustrated in FIGS. 1 and 2, the cylinder head 4 is provided with the injector 15 which injects fuel (gasoline) into the combustion chamber 6, and an ignition plug 16 which ignites the mixture gas in which the fuel injected into the combustion chamber 6 from the injector 15 is mixed with intake air.

As illustrated in FIG. 2, a cavity 20 is formed in a crown surface of the piston 5, where a comparatively large area including a central part of the piston 5 is dented to the opposite side from the cylinder head 4 (downwardly). Moreover, a squish part 21 which is comprised of an annular flat surface is formed in the crown surface of the piston 5, radially outward of the cavity 20.

The injector 15 is a multiple nozzle-hole injector having a plurality of nozzle holes at a tip end, and it is capable of injecting fuel radiately from the plurality of nozzle holes (F in FIG. 2 indicates a fuel spray of fuel injected from each nozzle hole). The injector 15 is disposed in a central part of a ceiling surface of the combustion chamber 6 so that the tip end thereof opposes to the central part of the crown surface of the piston 5 (the center of the bottom surface of the cavity 20).

Although detailed illustration is omitted, the injector 15 is connected to a fuel rail which is common to all the cylinders 2 through a fuel supply pipe. Inside the fuel rail, high-pressure fuel which is pressurized by a fuel feed pump (not illustrated) is stored. By supplying the fuel stored in the fuel rail to the injector 15 of each cylinder 2, the fuel is injected from each injector 15 into the combustion chamber 6 at a comparatively high pressure (e.g., a pressure exceeding 20 MPa).

Between the fuel feed pump and the fuel rail, a fuel pressure regulator 17 (FIG. 4) which changes the pressure of fuel supplied to the injector 15 (fuel pressure) is provided.

The ignition plug 16 is disposed at a position somewhat offset to the intake side from the injector 15. The position of the tip-end part of the ignition plug 16 (electrode part) is set so as to overlap with the cavity 20 in a plan view.

As illustrated in FIG. 1, the intake passage 30 is connected to one side surface of the cylinder head 4 so as to communicate with the intake port 9. Air (fresh air) taken in from an upstream end of the intake passage 30 is introduced into the combustion chamber 6 through the intake passage 30 and the intake port 9.

The intake passage 30 is provided with, from the upstream side, an air cleaner 31 which removes the foreign substance in the intake air, a throttle valve 32 which can open and close to adjust a flow rate of the intake air, a supercharger 33 which pumps the intake air while compressing the intake air, an intercooler 35 which cools the intake air which is compressed by the supercharger 33, and a surge tank 36. Note that the throttle valve 32 is one example of an "air amount adjusting mechanism" in the present disclosure. Note that in this embodiment, the introducing amount of air into the combustion chamber 6 varies also depending on the change of the valve timing of the intake and exhaust VVTs 13 and 14 described above, or open/close state of an EGR valve 53 described later. Thus, in this embodiment, the combination of the throttle valve 32, the intake and exhaust VVTs 13 and 14, and the EGR valve 53 is another example of the "air amount adjusting mechanism."

Respective parts of the intake passage 30 are provided with an airflow sensor SN3 which detects a flow rate of the intake air, an intake air temperature sensor SN4 which detects the temperature of the intake air, and an intake air pressure sensor SN5 which detects the pressure of the intake air. The airflow sensor SN3 and the intake air temperature sensor SN4 are provided to a part of the intake passage 30 between the air cleaner 31 and the throttle valve 32, and detect the flow rate and the temperature of the intake air which passes through this part, respectively. The intake air pressure sensor SN5 is provided to the surge tank 36 and detects the pressure of the intake air inside the surge tank 36.

The supercharger 33 is a mechanical supercharger which is mechanically coupled to the engine body 1. As the supercharger 33, it is not limited but any one of known superchargers, such as a Lysholm type, a root type, and a centrifugal type, can be used.

Between the supercharger 33 and the engine body 1, an electromagnetic clutch 34 which can electrically switch between its engagement state and disengagement state is provided. When the electromagnetic clutch 34 is engaged, a driving force is transmitted to the supercharger 33 from the engine body 1, and boosting by the supercharger 33 is then performed. On the other hand, when the electromagnetic clutch 34 is disengaged, the transmission of the driving force is intercepted, and the boosting by the supercharger 33 is suspended.

The intake passage 30 is provided with a bypass passage 38 for bypassing the supercharger 33. The bypass passage 38 connects the surge tank 36 with an EGR passage 51 (described later). The bypass passage 38 is provided with a bypass valve 39 which can be opened and closed.

The exhaust passage 40 is connected to the other side surface (opposite surface of the intake passage 30) of the cylinder head 4 so as to communicate with the exhaust port 10. The burnt gas generated inside the combustion chamber 6 is discharged outside through the exhaust port 10 and the exhaust passage 40.

The exhaust passage 40 is provided with a catalytic converter 41. A three-way catalyst 41a for purifying hazardous components (HC, CO, and $NO_x$) contained in exhaust gas circulating the exhaust passage 40, and a GPF (Gasoline Particulate Filter) 41b for collecting particulate matter (PM) contained in the exhaust gas are built in the catalytic converter 41.

An air-fuel ratio (A/F) sensor SN6 which detects an oxygen concentration in exhaust gas is provided to the exhaust passage 40 upstream of the catalytic converter 41.

The external EGR device 50 has the EGR passage 51 which connects the exhaust passage 40 with the intake passage 30, and an EGR cooler 52 and the EGR valve 53 provided to the EGR passage 51. The EGR passage 51 connects a part of the exhaust passage 40 downstream of the catalytic converter 41 with a part of the intake passage 30 between the throttle valve 32 and the supercharger 33. The EGR cooler 52 cools exhaust gas which recirculates from the exhaust passage 40 to the intake passage 30 through the EGR passage 51 (external EGR gas) by heat exchange. The EGR valve 53 is provided to the EGR passage 51 downstream of the EGR cooler 52 (closer to the intake passage 30) so as to be opened and closed, and adjusts a flow rate of exhaust gas which circulates the EGR passage 51.

(2) Control System

Figure 4:
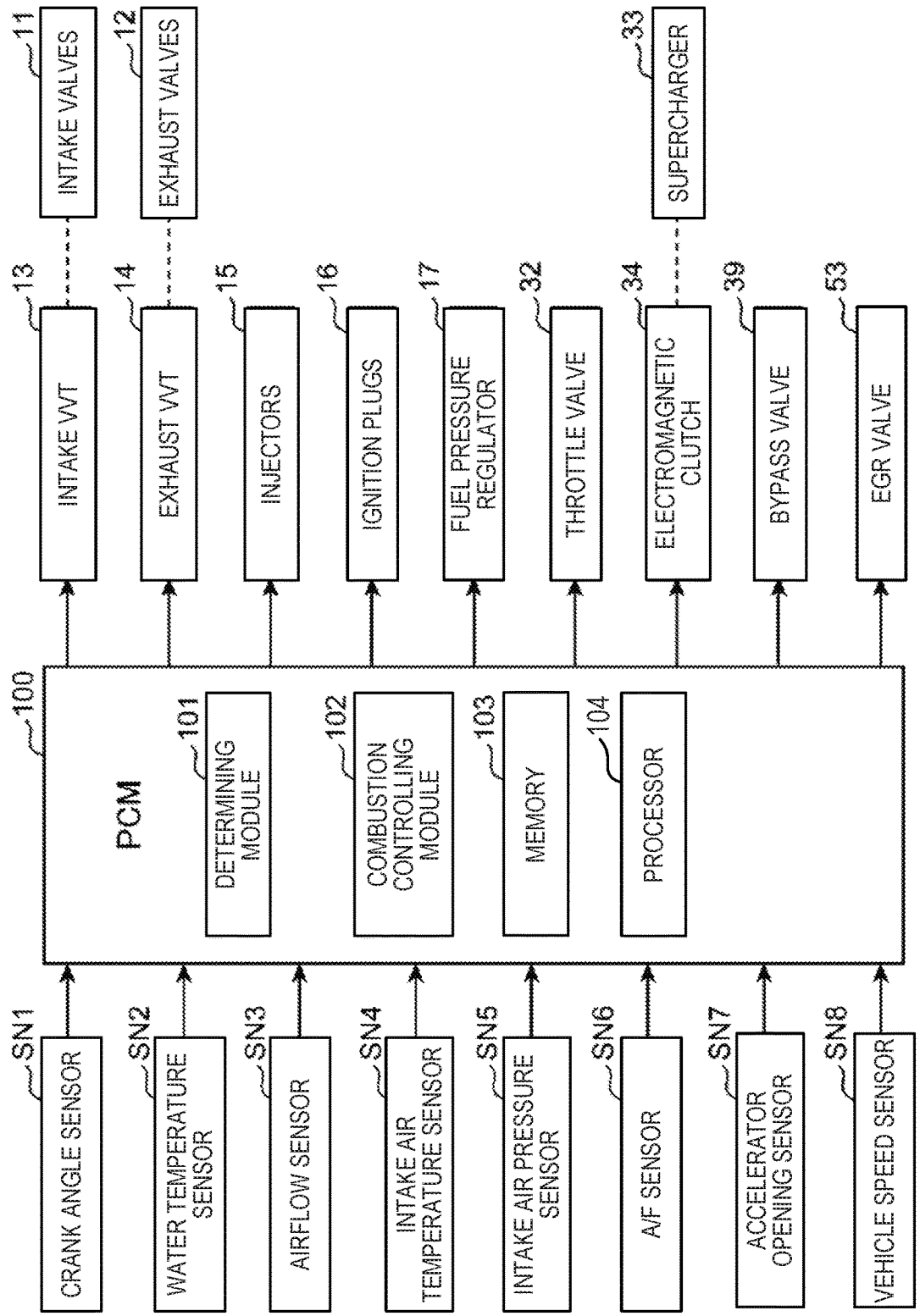
FIG. 4 is a block diagram illustrating a control system of the engine.

FIG. 4 is a block diagram illustrating a control system of the engine. A PCM (powertrain control module) 100 illustrated in this figure is a microcomputer for comprehensively controlling the engine, etc., and is comprised of a processor 104 (e.g., a central processing unit (CPU)) which executes software programs and memory 103 that includes ROM and RAM, etc. which are well known.

Detection signals of various sensors are inputted into the PCM 100. For example, the PCM 100 is electrically connected to the crank angle sensor SN1, the water temperature sensor SN2, the airflow sensor SN3, the intake air temperature sensor SN4, the intake air pressure sensor SN5, and the A/F sensor SN6 which are described above. Information detected by these sensors (i.e., a crank angle, an engine speed, an engine water temperature, an intake air flow rate, an intake air temperature, an intake pressure, and an oxygen concentration) are sequentially inputted into the PCM 100.

Moreover, the vehicle is provided with an accelerator opening sensor SN7 which detects an opening of an accelerator pedal (hereinafter, referred to as "the accelerator opening") operated by a driver who operates the vehicle, and a vehicle speed sensor SN8 which detects a traveling speed of the vehicle (hereinafter, referred to as "the vehicle speed"). Detection signals of these sensors SN7 and SN8 are also sequentially inputted into the PCM 100.

The PCM 100 controls each part of the engine, while performing various determinations, calculations, etc. based on the input information from the corresponding sensor(s). That is, the PCM 100 is electrically connected, for example, to the intake and exhaust VVTs 13 and 14, the injector 15, the ignition plug 16, the fuel pressure regulator 17, the throttle valve 32, the electromagnetic clutch 34, the bypass valve 39, and the EGR valve 53, and based on the result(s) of the calculation(s), etc., it outputs a control signal to the corresponding device.

In detail, the PCM 100 further comprises a determining module 101 and a combustion controlling module 102 stored in the memory 103 as software modules. The processor 104 is configured to execute these modules to perform their respective functions.

The combustion controlling module 102 is a control module which controls combustion of the mixture gas inside the combustion chamber 6, and controls each part of the engine so that an output torque, etc. of the engine becomes a suitable value according to a demand of a driver. The determining module 101 is a control module which performs various determinations required for determining contents of the control executed by the combustion controlling module 102. The memory 103 stores various data required for processings in the determining module 101 and the combustion controlling module 102.

(3) Control According to Operating State

Figure 5:
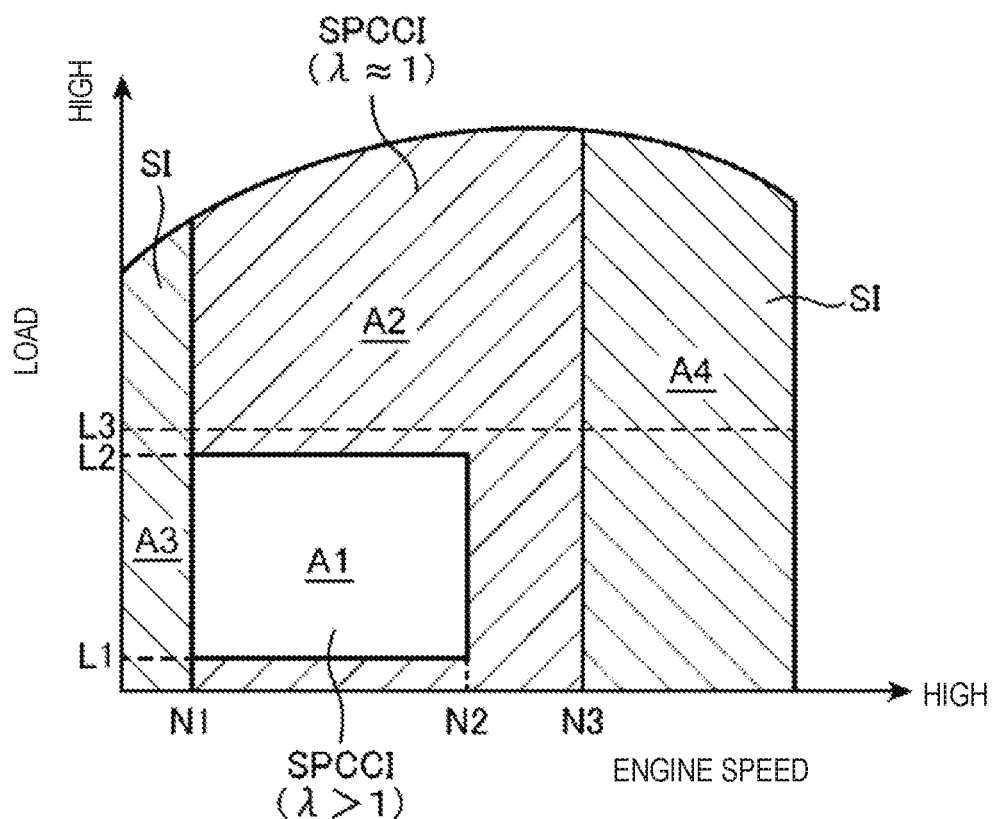
FIG. 5 is an operation map in which an operating range of the engine is classified by a difference in a combustion mode.

FIG. 5 is an operation map used under a condition where an engine water temperature T is a first threshold T1 determined beforehand or higher, and is a view illustrating a difference of control according to the engine speed and load. Note that in this embodiment, the first threshold T1 is set to 70° C.

As illustrated in FIG. 5, when the engine water temperature T is the first threshold T1 (70° C.) or higher, the operating range of the engine is roughly divided into four operating ranges A1-A4 according to the difference in the combustion mode. Suppose the four operating ranges are a first operating range A1, a second operating range A2, a third operating range A3, and a fourth operating range A4, the third operating range A3 is an extremely low-speed range where the engine speed is lower than a first speed N1, and the fourth operating range A4 is a high-speed range where the engine speed is a third speed N3 or higher, and the first operating range A1 is a low-speed low-load range where the load is comparatively low, other than the third and fourth operating range A3 and A4 (low and middle-speed range), and the second operating range A2 is a remaining range other than the first, third, and fourth operating ranges A1, A3, and A4.

The first operating range A1 is an example of a "low-load range" in the present disclosure. According to the example of FIG. 5, the first operating range A1 is a range of a substantially rectangular shape located inside the second operating range A2, and is surrounded by the first speed N1 which is a lower-limit speed of the second operating range A2, the second speed N2 lower than an upper-limit speed (third speed N3) of the second operating range A2, a first load L1 higher than the minimum load of the engine, and a second load L2 higher than the first load L1. The second load L2 which is an upper-limit load of the first operating range A1 is set to a value slightly lower than a third load L3 which is a lower-limit load at which the supercharger 33 can be driven. That is, the first operating range A1 is set so as not to overlap with the boosting area where the boost by the supercharger 33 is performed.

Below, an outline of a combustion control in the first to fourth operating ranges A1-A4 is described.

(3-1) First Operating Range

In the first operating range A1 with the low speed and the low load, partial compression ignition combustion in which spark ignition (SI) combustion and compression ignition (CI) combustion are combined is performed (hereinafter, referred to as SPCCI combustion). SI combustion is a combustion mode in which the mixture gas is ignited by sparks generated from the ignition plug 16, and the mixture gas is forcibly combusted by flame propagation which extends a combustion range from an ignited point to the perimeter. CI combustion is a combustion mode in which the mixture gas is combusted by a self-ignition under the environment where the mixture gas is brought to a sufficiently high temperature and high pressure by compression of the piston 5. The SPCCI combustion which is the combination of SI combustion and CI combustion is a combustion mode in which SI combustion of a portion of the mixture gas inside the combustion chamber 6 is performed by a jump-spark ignition performed under the environment where the mixture gas is about to self-ignite, and CI combustion of the remaining mixture gas inside the combustion chamber 6 is performed by a self-ignition after the SI combustion (i.e., by the further increase in the temperature and the pressure accompanying the SI combustion). Note that "SPCCI" is an abbreviation for "SPark Controlled Compression Ignition."

Figure 6:
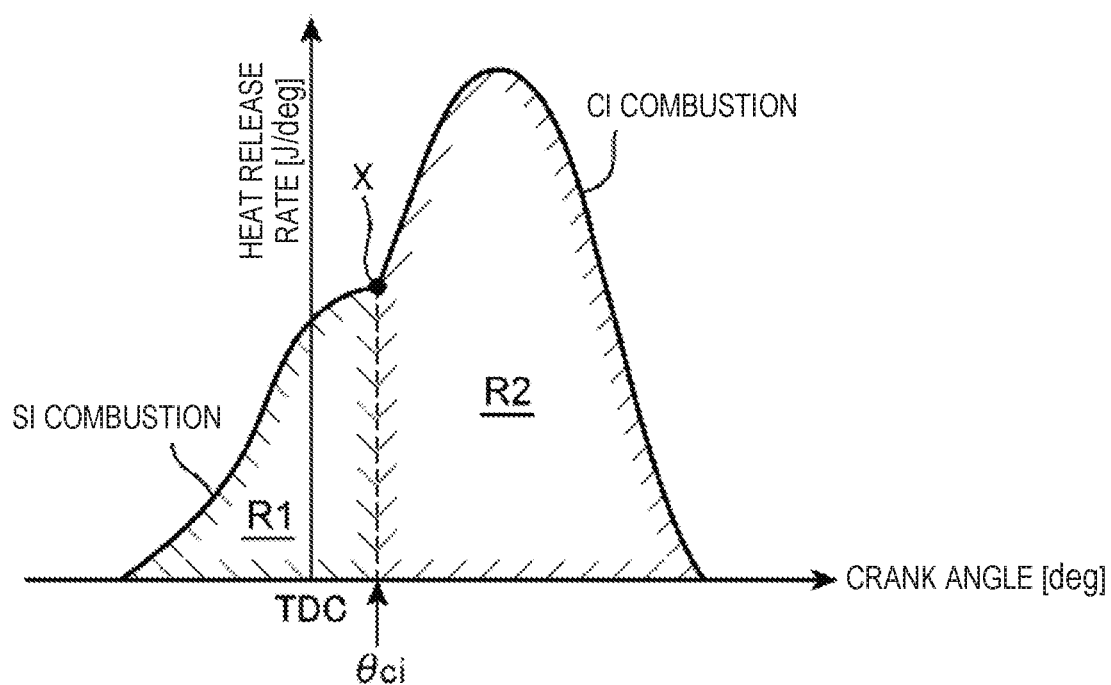
FIG. 6 is a graph illustrating a waveform of a rate of heat release during SPCCI combustion (partial compression ignition combustion).

FIG. 6 illustrates a graph illustrating a combustion waveform, i.e., a change in a rate of heat release (J/deg) by a crank angle, when the SPCCI combustion described above is performed. As illustrated in this figure, in SPCCI combustion, a heat release by SI combustion and a heat release by CI combustion are continuously generated in this order. At this time, due to the nature in which a combusting rate of CI combustion is quicker, a rise of the heat release of CI combustion is steeper than that of SI combustion. For this reason, the waveform of the rate of heat release in SPCCI combustion has a point of inflection X which appears at a timing of switching from SI combustion to CI combustion ($\theta ci$, described later).

As a specific mode of such SPCCI combustion, in the first operating range A1, a control in which an A/F lean mixture gas having an air-fuel ratio larger than a stoichiometric air-fuel ratio is formed inside the combustion chamber 6, and SPCCI combustion of the mixture gas is performed, in other words, a control in which SPCCI combustion of the mixture gas at $\lambda>1$ ($\lambda$ is an excess air factor) is carried out, is performed. In order to achieve such A/F-lean SPCCI combustion, in the first operating range A1, each part of the engine is controlled by the PCM 100 as follows.

The opening of the throttle valve 32 is set to a comparatively large value so that an amount of air more than the amount of air corresponding to a stoichiometric air-fuel ratio is introduced into the combustion chamber 6 through the intake passage 30. That is, in the first operating range A1, a target value of the air-fuel ratio (A/F) which is a weight ratio of air (fresh air) introduced into the combustion chamber 6 through the intake passage 30 to fuel injected into the combustion chamber 6 from the injector 15 is set to a value larger than the stoichiometric air-fuel ratio (14.7:1) (for example, about 20:1 to about 35:1). Then, based on the target value of the air-fuel ratio (target air-fuel ratio) and the oxygen concentration, etc. in exhaust gas detected by the A/F sensor SN6, the opening of the throttle valve 32 is determined so that the air-fuel ratio inside the combustion chamber 6 is in agreement with the target air-fuel ratio, and the throttle valve 32 is controlled according to this determination.

The supercharger 33 is suspended. That is, since the first operating range A1 is located at a lower load side of the third load L3 which is the lower limit of the load range which requires boosting, the boost by the supercharger 33 is unnecessary. Therefore, in the first operating range A1, the electromagnetic clutch 34 is released to disconnect the supercharger 33 from the engine body 1, and the bypass valve 39 is fully opened, to suspend the boost by the supercharger 33.

Here, in SPCCI combustion which is the combination of SI combustion and CI combustion, it is important to control a ratio of SI combustion and CI combustion according to the operating condition. In this embodiment, focusing on a SI ratio which is a ratio of an amount of heat release by SI combustion to the total amount of heat release by SPCCI combustion (SI combustion and CI combustion), each part of the engine is controlled so that the SI ratio becomes an appropriate value.

The SI ratio is described with reference to FIG. 6. In FIG. 6, suppose that the crank-angle $\theta ci$ corresponding to the point of inflection X at which the combustion mode changes from SI combustion to CI combustion is a start timing of CI combustion. In this case, the amount of heat release by SI combustion corresponds to a waveform area R1 of the rate of heat release at the advancing side of $\theta ci$ (start timing of CI combustion), and the amount of heat release by CI combustion corresponds to a waveform area R2 of the rate of heat release at the retarded side of $\theta ci$. The SI ratio can be defined as $R1/(R1+R2)$ using the areas R1 and R2.

In the first operating range A1 where SPCCI combustion is performed, each part of the engine is controlled so that the SI ratio and $\theta ci$ which are described above match with target values defined beforehand. That is, in the first operating range A1, a target SI ratio which is a target value of the SI ratio and a target $\theta ci$ which is a target value of $\theta ci$ are defined, respectively, for each of various conditions with different engine loads and speeds. Then, a plurality of parameters, such as an injection amount and an injection timing of fuel from the injector 15, a timing of the jump-spark ignition by the ignition plug 16 (ignition timing), and an EGR rate (an external EGR rate and an internal EGR rate) are controlled so as to become a combination which can realize the target SI ratio and the target $\theta ci$. Note that the external EGR rate is a weight ratio of the external EGR gas (exhaust gas which recirculates to the combustion chamber 6 through the EGR passage 51) to the entire gas inside the combustion chamber 6. The internal EGR rate is a weight ratio of the internal EGR gas (burnt gas which remains inside the combustion chamber 6 by the internal EGR) to the entire gas inside the combustion chamber 6.

For example, the injection amount and the injection timing of fuel are determined by using a map defined beforehand in consideration of the target SI ratio and the target θci. Moreover, for the external EGR rate and the internal EGR rate, the open and close timings of the intake and exhaust valves 11 and 12 which are the main influencing factors of both EGR rates, and the opening of the EGR valve 53 are determined by using a map which is also defined in consideration of the target SI ratio and the target θci.

On the other hand, the timing of the jump-spark ignition (ignition timing) by the ignition plug 16 is determined as a timing at which the target SI ratio and the target θci are obtained by the calculation using a given model formula.

Figure 9:
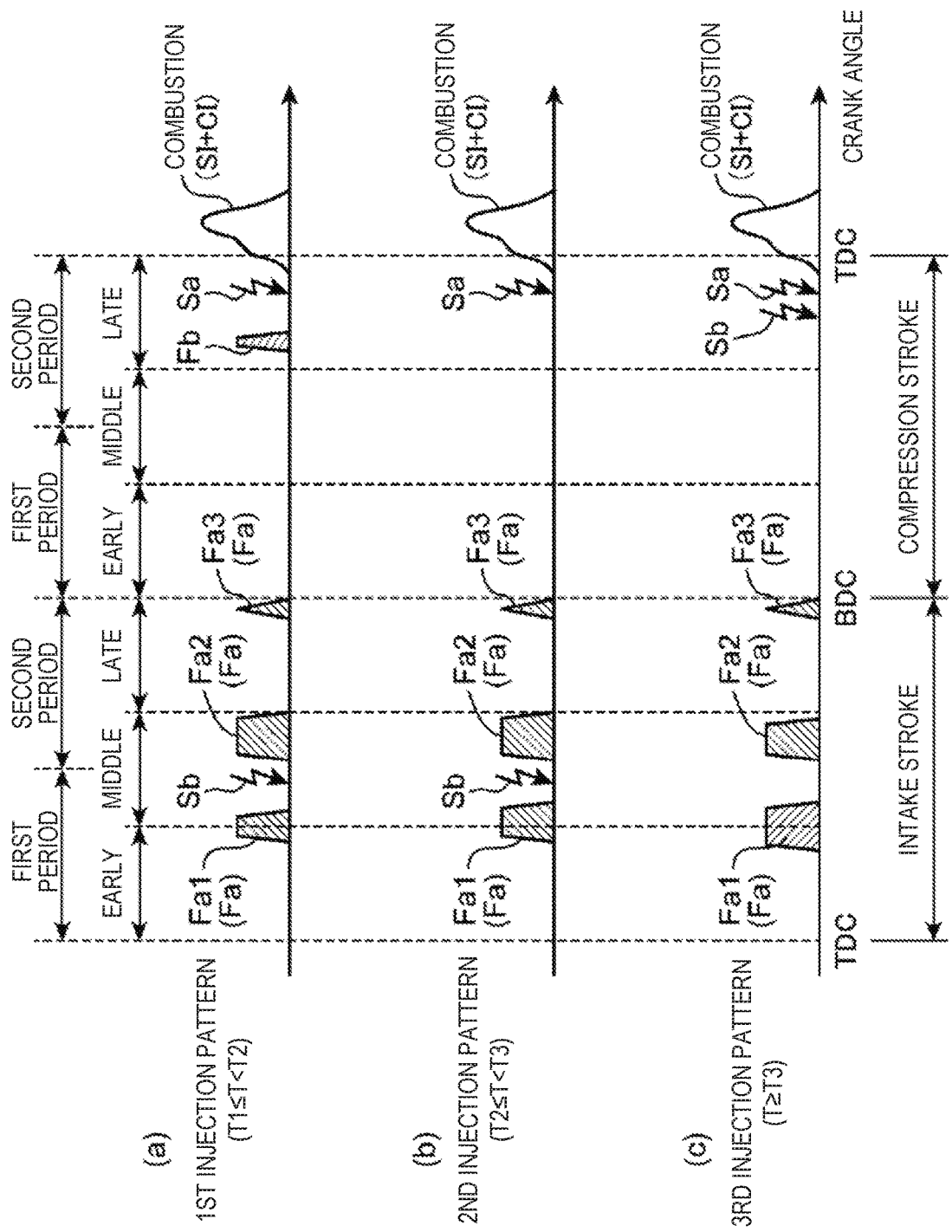
FIG. 9 is a time chart illustrating patterns of a fuel injection and a jump-spark ignition performed in a first operating range (low-load range) of the engine, where Charts (a) to (c) illustrate the patterns in conditions with different engine water temperatures.

Here, in the first operating range A1, a plurality of jump-spark ignitions are performed (here, twice) per one combustion cycle. That is, in the first operating range A1, in order to secure ignition stability that is also sufficient under the A/F lean environment, a main ignition Sa which is a normal jump-spark ignition (performed near a compression top dead center) for forcibly igniting the mixture gas, and additionally, a preceding ignition Sb which generates sparks earlier than the main ignition are performed, as illustrated in FIG. 9 (described later). In this case, the timing of the main ignition Sa is determined using the model formula. Note that the timing of the preceding ignition Sb is suitably determined based on the fuel injection timing, the engine water temperature, etc.

As described above, in the first operating range A1, by the method in which the map defined beforehand and the calculation using the model formula are combined, the ignition timings (timings of the main ignition and the preceding ignition), the injection amount and the injection timing of fuel, the open and close timings of the intake and exhaust valves 11 and 12, and the opening of the EGR valve 53 are controlled to become a combination so that the appropriate SI ratio and θci (the target SI ratio and the target θci) which are defined beforehand for every operating condition are obtained.

(3-2) Second Operating Range

Also in the second operating range A2, which is a speed range equal to or higher than the first speed N1 and lower than the third speed N3 (low and middle-speed range), excluding the first operating range A1, the control for combusting the mixture gas by SPCCI combustion is performed. Note that in the second operating range A2, unlike the first operating range A1, the air-fuel ratio (A/F) in the combustion chamber 6 is set near a stoichiometric air-fuel ratio, and the number of jump-spark ignitions by the ignition plug 16 is restricted to once per cycle.

That is, in the second operating range A2, the opening of the throttle valve 32 is set to an opening at which the amount of air equivalent to a stoichiometric air-fuel ratio is introduced into the combustion chamber 6 through the intake passage 30, i.e., an opening at which the air-fuel ratio (A/F) which is the weight ratio of air (fresh air) to fuel inside the combustion chamber 6 is substantially in agreement with a stoichiometric air-fuel ratio (14.7:1). In other words, in the second operating range A2, a control in which SPCCI combustion of the mixture gas is carried out under a stoichiometric environment where the air-fuel ratio inside the combustion chamber 6 becomes near the stoichiometric air-fuel ratio is performed.

Moreover, the jump-spark ignition by the ignition plug 16 is performed near a compression top dead center at a frequency of once per cycle. That is, in the second operating range A2, only the normal jump-spark ignition which forcibly ignites the mixture gas is performed near a compression top dead center, and the ignition equivalent to the preceding ignition described above is not performed.

Here, also in the second operating range A2, the target SI ratio and the target θci are defined for every condition of the engine speed and load, similar to the first operating range A1 described above. The injection amount and the injection timing of fuel, the open and close timings of the intake and exhaust valves 11 and 12, and the opening of the EGR valve 53 are determined using the map defined beforehand so that they become values suitable for achieving the target SI ratio and the target θci. Moreover, for the ignition timing by the ignition plug 16, the ignition timing which can achieve the target SI ratio and the target θci is determined by the calculation using the given model formula.

The supercharger 33 is driven or suspended according to whether the engine load is higher or lower than the third load L3. That is, the supercharger 33 is driven in a partial range of the second operating range A2 at the high load side where the engine load becomes the third load L3 or higher, and is suspended in a partial area of the second operating range A2 at the low load side where the engine load becomes lower than the third load L3. In the range at the high load side where the supercharger 33 is driven, the boost by the supercharger 33 is performed by connecting the electromagnetic clutch 34 to connect the supercharger 33 with the engine body 1. At this time, the opening of the bypass valve 39 is controlled so that the pressure inside the surge tank 36 (boosting pressure) detected by the intake air pressure sensor SN5 becomes in agreement with a target pressure defined beforehand for every condition of the engine speed and load.

(3-3) Third Operating Range and Fourth Operating Range

In the third operating range A3 (very low-speed range) where the engine speed is lower than the first speed N1, and the fourth operating range A4 (high-speed range) where the engine speed is the third speed N3 or higher, a control for combusting the mixture gas by SI combustion is performed. For example, while the entire amount of fuel to be injected in one cycle is injected during an intake stroke from the injector 15, the jump-spark ignition by the ignition plug 16 is performed near compression top dead center. Then, SI combustion is started triggered by this jump-spark ignition, and all the mixture gas inside the combustion chamber 6 combusts by flame propagation.

(4) Injection and Ignition Control in First Operating Range

Figure 7:
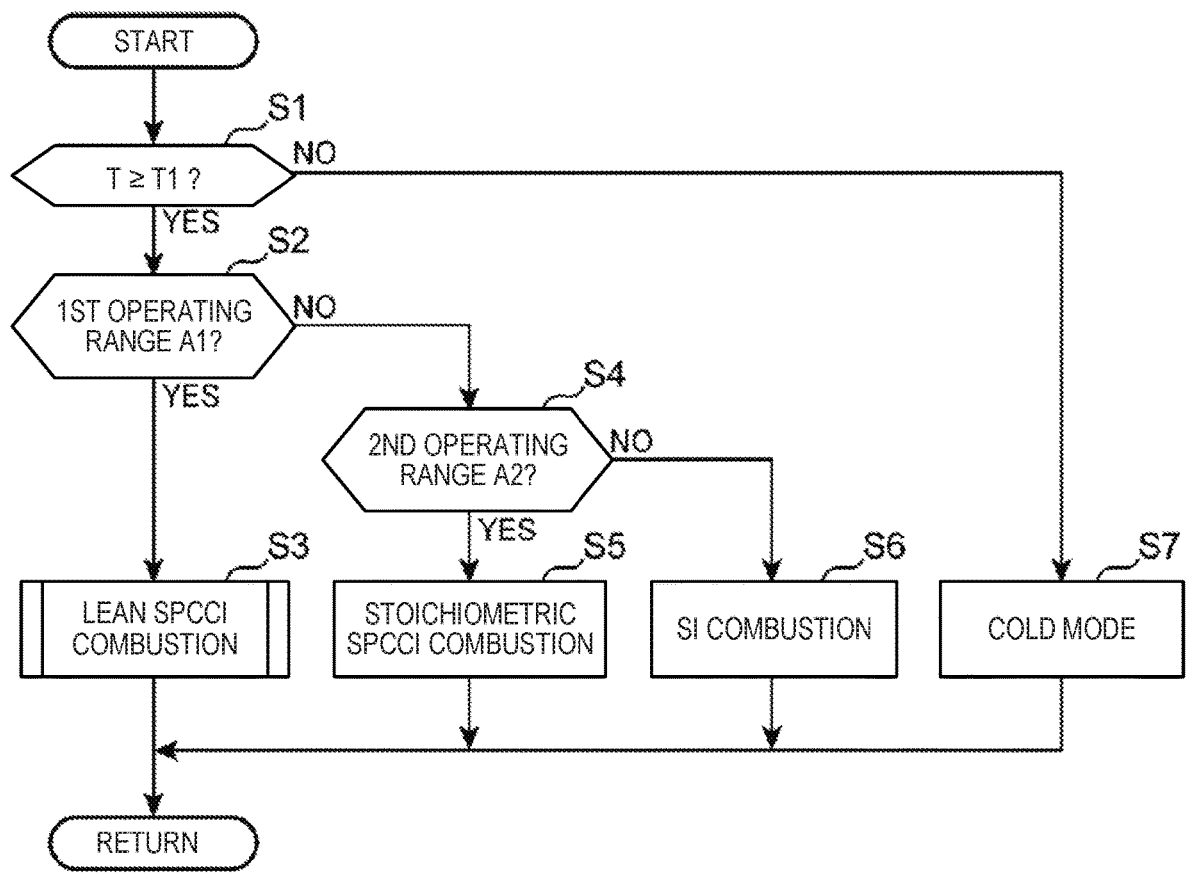
FIG. 7 is a flowchart illustrating a control operation executed during operation of the engine.

Next, a more specific example of the control in the first operating range A1, particularly, an example of the control related to the fuel injection and the jump-spark ignition is described with reference to FIGS. 7 and 8. When the control illustrated in a flowchart of FIG. 7 starts, the determining module 101 of the PCM 100 determines whether the engine water temperature T detected by the water temperature sensor SN2 is the first threshold T1 (70° C.) or higher at Step S1.

If it is determined as NO at Step S1 and it is confirmed that the engine water temperature T is lower than T1, the combustion controlling module 102 of the PCM 100 shifts to Step S7, where a combustion control based on an operation map different from the operation map illustrated in FIG. 5 in a mode of the combustion control which is suitable for the low engine water temperature (cold mode) is performed. In the cold mode, the combustion mode in which ignition stability can be secured even if the engine water temperature is low is selected. Although the specific combustion mode may change according to the engine water temperature T, for example, when the engine water temperature T is greatly below the first threshold T1 (70° C.), it is possible to perform SI combustion in all the operating ranges, while prohibiting SPCCI combustion. Moreover, when the engine water temperature T is slightly lower than the first threshold T1, it is possible to make the mode of SPCCI combustion into a different mode from that when T≥T1 (e.g., the air-fuel ratio in the range equivalent to the first operating range A1 illustrated in FIG. 5 is not set lean, but it is set near a stoichiometric air-fuel ratio), while adopting the mode which uses both SPCCI combustion and SI combustion similar to FIG. 5.

On the other hand, if it is determined as YES at Step S1, and it is confirmed that the engine water temperature T is the first threshold T1 or higher, the determining module 101 shifts to Step S2, where it determines whether the current operation point of the engine is included in the first operating range A1 illustrated in FIG. 5. That is, based on the engine speed detected by the crank angle sensor SN1, and the engine load identified from the detection value of the accelerator sensor SN7 (accelerator opening), the detection value of the vehicle speed sensor SN8 (vehicle speed), etc., the determining module 101 identifies the current operation point of the engine on the operation map of FIG. 5, and determines whether the current operation point is included in the first operating range A1 in the map.

If it is determined as YES at Step S2 and it is confirmed that the current operation point of the engine is included in the first operating range A1, the combustion controlling module 102 shifts to Step S3, where a control is performed in which SPCCI combustion of the mixture gas is performed, while adjusting the air-fuel ratio inside the combustion chamber 6 to a value larger than a stoichiometric air-fuel ratio (λ>1) (lean SPCCI combustion).

On the other hand, if it is determined as NO at Step S2 and it is confirmed that the current operation point of the engine is not included in the first operating range A1, the determining module 101 shifts to Step S4, where it determines whether the current operation point is included in the second operating range A2.

If it is determined as YES at Step S4 and it is confirmed that the current operation point of the engine is included in the second operating range A2, the combustion controlling module 102 shifts to Step S5, where a control is performed in which SPCCI combustion of mixture gas is carried out, while adjusting the air-fuel ratio inside the combustion chamber 6 to near the stoichiometric air-fuel ratio (λ≈1) (stoichiometric SPCCI combustion).

On the other hand, if it is determined as NO at Step S4, that is, it is confirmed that the current operation point of the engine is included in the third operating range A3 or the fourth operating range A4 illustrated in FIG. 5, the combustion controlling module 102 shifts to Step S6, where it performs a control in which the mixture gas is combusted not by SPCCI combustion but by SI combustion.

Figure 8:
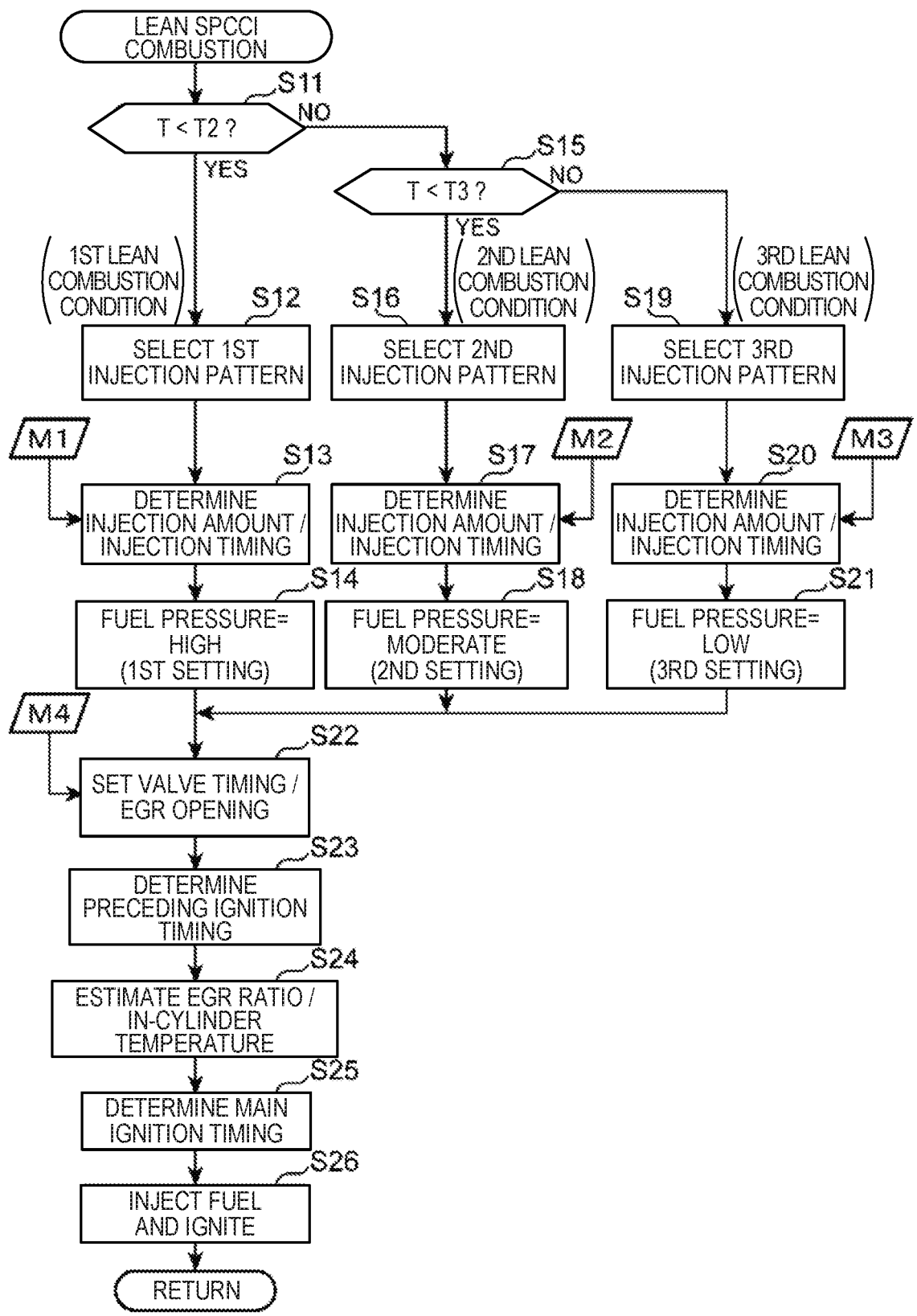
FIG. 8 is a subroutine illustrating a specific procedure of Step S3 in FIG. 7.

FIG. 8 illustrates a subroutine illustrating a specific procedure of the control illustrated at Step S3 (lean SPCCI combustion). As this control of the subroutine is started, the determining module 101 determines at Step S11 whether the engine water temperature T detected by the water temperature sensor SN2 is lower than a second threshold T2. The second threshold T2 is a temperature larger than the first threshold T1 (70° C.) described above by a given amount, and it is set to 90° C. in this embodiment.

If it is determined as YES at Step S11 and it is confirmed that the engine water temperature T is lower than the second threshold T2, the combustion controlling module 102 shifts to Step S12, where it selects a first injection pattern illustrated in Chart (a) of FIG. 9 as the injection pattern of fuel by the injector 15.

As illustrated in Chart (a) of FIG. 9, the first injection pattern is an injection pattern in which three fuel injections Fa1, Fa2, and Fa3 are performed during an intake stroke, and one fuel injection Fb is performed during the second half of a compression stroke. Below, "Fa1" is referred to as a first early injection, "Fa2" is referred to as a second early injection, "Fa3" is referred to as a third early injection, and "Fb" is referred to as a retarded injection. Moreover, the first to third early injections Fa1-Fa3 may be simply and comprehensively referred to as "the early injection Fa."

In the first injection pattern, the first early injection Fa1 is started in an early period of an intake stroke, the second early injection Fa2 is started in a middle period of the intake stroke, and the third early injection Fa3 is started in a late period of the intake stroke. Moreover, the retarded injection Fb is started in the second half of a compression stroke, in more detail, a late period of the compression stroke. In other words, when the first injection pattern is selected, the injector 15 performs the early injection Fa dividedly in 3 steps (Fa1, Fa2, and Fa3) during an intake stroke, and performs one retarded injection Fb in the second half of a compression stroke (in detail, the late period of the compression stroke).

Note that the terms "early period," "middle period," and "late period" (or "first half" and "second half") of a certain stroke as used herein refer to the followings. Herein, when an arbitrary stroke, such as an intake stroke or a compression stroke, is equally divided into two periods, the first period and the second period are defined as the "first half" and the "second half," respectively. Therefore, for example, (i) the first half and (ii) the second half of a compression stroke refer to ranges of (i) 180° CA to 90° CA before a compression top dead center (BTDC) and (ii) 90° CA to 0° CA BTDC, respectively. Similarly, when the arbitrary stroke is equally divided into three, and the first period, the second period, and the third period are herein defined as the "early period," "middle period," and "late period," respectively. Therefore, for example, (iii) the early period, (iv) the middle period, and (v) the late period of an intake stroke refer to (iii) 360° CA to 300° CA BTDC, (iv) 300° CA to 240° CA BTDC, and (v) 240° CA to 180° CA BTDC, respectively.

Here, if the determination result at Step S11 is YES, this means that the engine is operated in the first operating range A1, and the engine water temperature T is the first threshold T1 or higher and is lower than the second threshold T2. In this embodiment, this condition is referred to as a "first lean combustion condition." The first lean combustion condition belongs to a category where the engine water temperature is low, among the conditions in which the lean SPCCI combustion can be performed. The first injection pattern (Chart (a) of FIG. 9) selected at Step S12 is an injection pattern suitable for the first lean combustion condition at the comparatively low temperature.

Next, the combustion controlling module 102 shifts to Step S13, where it determines the injection amount and the injection timing of each fuel injection in the first injection pattern (three early injections Fa1-Fa3 and one retarded injection Fb) based on the engine load (required torque) and the engine speed. A map M1 is referenced when determining the injection amount and the injection timing. The map M1 defines the injection amount and the injection timing of each of the injections Fa1-Fa3 and Fb in the first injection pattern for every condition of the engine speed and load, and is stored beforehand in the memory 103. The injection amount and the injection timing on this map M1 are defined in consideration of the target SI ratio and the target θci described in (3-1). In other words, at Step S13, the injection amount and the injection timing of each of the injections Fa1-Fa3 and Fb in the first injection pattern are determined so that they become values suitable for achieving the target SI ratio and the target θci.

Next, the combustion controlling module 102 shifts to Step S14, where it controls the fuel pressure regulator 17 so that the injection pressure by the injector 15 becomes a first setting which is comparatively high. For example, the first setting may be about 70 MPa.

Next, a control when it is determined as NO at Step S11, that is, when it is confirmed that the engine water temperature T is the second threshold T2 or higher is described. In this case, the determining module 101 shifts to Step S15, where it determines whether the engine water temperature T is lower than a third threshold T3. The third threshold T3 is a temperature larger than the second threshold T2 (90° C.) described above by a given amount, and in this embodiment, it is set to 116° C.

If it is determined as YES at Step S15 and it is confirmed that the engine water temperature T is the second threshold T2 or higher and lower than the third threshold T3, the combustion controlling module 102 shifts to Step S16, where it selects a second injection pattern illustrated in Chart (b) of FIG. 9 as the injection pattern of fuel by the injector 15.

As illustrated in Chart (b) of FIG. 9, the second injection pattern is an injection pattern in which three fuel injections comprised of the first early injection Fa1, the second early injection Fa2, and the third early injection Fa3 are performed during an intake stroke. Unlike the first injection pattern (Chart (a) of FIG. 9) described above, the retarded injection Fb is not performed.

The rough timings of the early injections Fa1-Fa3 in the second injection pattern are similar to those in the first injection pattern. That is, also in the second injection pattern, the first early injection Fa1 is started in the early period of an intake stroke, the second early injection Fa2 is started in the middle period of the intake stroke, and the third early injection Fa3 is started in the late period of the intake stroke. However, since the retarded injection Fb is prohibited, the injection amount of the first early injection Fa1 is increased by an amount corresponding to the retarded injection Fb.

Here, if the determination result at Step S15 is YES, this means that the engine is operated in the first operating range A1 and the engine water temperature T is the second threshold T2 or higher and lower than the third threshold T3. In this embodiment, this condition is referred to as a "second lean combustion condition." The second lean combustion condition belongs to a category where the engine water temperature is moderate, among the conditions where the lean SPCCI combustion can be performed. The second injection pattern (Chart (b) of FIG. 9) selected at Step S16 is an injection pattern suitable for the second lean combustion condition at the moderate temperature.

Next, the combustion controlling module 102 shifts to Step 17, where it determines the injection amount and the injection timing of each fuel injection in the second injection pattern (three early injections Fa1-Fa3) based on the engine load and the engine speed. A map M2 is referenced for determining the injection amount and the injection timing. The map M2 defines the injection amount and the injection timing of each of the injections Fa1-Fa3 in the second injection pattern for every condition of the engine speed and load, and is stored beforehand in the memory 103. The injection amount and the injection timing on this map M2 are defined in consideration of the target SI ratio and the target θci described above. In other words, at Step S17, the injection amount and the injection timing of each of the injections Fa1-Fa3 in the second injection pattern are determined so that they become values suitable for achieving the target SI ratio and the target θci.

Next, the combustion controlling module 102 shifts to Step S18, and it controls the fuel pressure regulator 17 so that the injection pressure by the injector 15 becomes a second setting at a moderate pressure. For example, the second setting may be about 40 MPa to 70 MPa.

Next, a control when it is determined as NO at Step S15, that is, when it is confirmed that the engine water temperature T is the third threshold T3 (116° C.) or higher is described. In this case, the determining module 101 shifts to Step S19, where it selects a third injection pattern illustrated in Chart (c) of FIG. 9 as the injection pattern of fuel by the injector 15.

As illustrated in Chart (c) of FIG. 9, the third injection pattern is an injection pattern in which the three fuel injections comprised of the first early injection Fa1, the second early injection Fa2, and the third early injection Fa3 are performed during an intake stroke, and is similar to the second injection pattern (Chart (b) of FIG. 9) described above. The first early injection Fa1 is started in the early period of the intake stroke, the second early injection Fa2 is started in the middle period of the intake stroke, and the third early injection Fa3 is started in the late period of the intake stroke. Note that compared with the second injection pattern, the start timing of the first early injection Fa1 which is the first fuel injection is made earlier, and the ratio of the injection amount of the first early injection Fa1 (divided ratio) is increased.

Here, if the determination result at Step S15 is NO, this means that the engine is operated in the first operating range A1 and the engine water temperature T is the third threshold T3 or higher. In this embodiment, this condition is referred to as a "third lean combustion condition." The third lean combustion condition belongs to a category where the engine water temperature is high, among the conditions where the lean SPCCI combustion can be performed. The third injection pattern selected at Step S19 is an injection pattern suitable for the third lean combustion condition at the comparatively high temperature.

Next, the combustion controlling module 102 shifts to Step S20, where it determines the injection amount and the injection timing of each of the fuel injection (three early injections Fa1-Fa3) in the third injection pattern based on the engine load and the engine speed. A map M3 is referred to for determining the injection amount and the injection timing. The map M3 defines the injection amount and the injection timing of each of the injections Fa1-Fa3 in the third injection pattern for every condition of the engine speed and load, and is stored beforehand in the memory 103. The injection amount and the injection timing on this map M3 are set in consideration of the target SI ratio and the target θci described above. In other words, at Step S20, the injection amount and the injection timing of each of the injections Fa1-Fa3 in the third injection pattern are determined so that they become values suitable for achieving the target SI ratio and the target θci.

Next, the combustion controlling module 102 shifts to Step S21, where it controls the fuel pressure regulator 17 so that the injection pressure by the injector 15 becomes a third setting at a comparatively low pressure. For example, the third setting may be about 40 MPa.

As described above, after the setup of the injection pattern (the injection amount and the injection timing) and the injection pressure of fuel is finished, the combustion controlling module 102 shifts to Step S22, where the open and close timings of the intake and exhaust valves 11 and 12 (valve timings), and the opening of the EGR valve 53 (EGR valve opening) are determined based on the engine load and the engine speed, and controls the intake and exhaust VVTs 13 and 14 and the EGR valve 53 so that the valve timing and the EGR valve opening which are determined become the target values. A map M4 is referenced for determining the valve timings and the EGR valve opening. The map M4 defines the valve timings and the EGR valve opening for every condition of the engine speed and load, and is stored beforehand in the memory 103. By referencing such a map M4, the valve timings and the EGR valve opening are set to values suitable for achieving the target SI ratio and the target θci.

Next, the combustion controlling module 102 shifts to Step S23, where it determines the timing of the preceding ignition Sb. The timing of the preceding ignition Sb is determined based on the fuel injection timing determined at the previous step (any one of Steps S13, S17, and S20). For example, when the first or second lean combustion condition is satisfied and the first injection pattern (Chart (a) of FIG. 9) or the second injection pattern (Chart (b) of FIG. 9) is selected, a given crank angle timing which is located between the first early injection Fa1 and the second early injection Fa2 is determined as the timing of the preceding ignition Sb. Moreover, when the third lean combustion condition is satisfied and the third injection pattern (Chart (c) of FIG. 9) is selected, a timing at which a given crank angle passes from the end time of the third early injection Fa3 and which corresponds immediately before the main ignition Sa is determined as the timing of the preceding ignition Sb.

Here, the energy of the preceding ignition Sb is set to a comparatively low energy which does not cause the flame propagation of the mixture gas, in detail, the energy in which the mixture gas around sparks (arc) goes up to 850K or higher and 1140K or lower. This is to cleave the fuel component by the preceding ignition Sb to generate an intermediate product which is highly reactive, thereby speeding up the combustion rate of the mixture gas using the intermediate product. That is, when the temperature of mixture gas is increased to such a temperature range, the fuel component (hydrocarbon) is cleaved to generate hydrogen peroxide ($H_2O_2$) and formaldehyde ($CH_2O$), and these components create OH radicals. Since OH radicals are strong in oxidization and highly reactive, the generation of the intermediate product containing such OH radicals inside the combustion chamber 6 after the preceding ignition speeds up the combusting rate of the mixture gas, thereby improving thermal efficiency. On the other hand, even if the temperature of the mixture gas is increased to the temperature range by the preceding ignition Sb, a flame is not substantially formed in the mixture gas, and therefore, SI combustion does not start. Accordingly, the energy of the main ignition Sa is set sufficiently higher than the energy of the preceding ignition Sb to cause the mixture gas to perform the flame propagation.

Next, the combustion controlling module 102 shifts to Step S24, where it estimates an actual EGR rate inside the combustion chamber 6 and a temperature inside the combustion chamber 6 (in-cylinder temperature) near a compression top dead center (at or near the compression top dead center). As described above, in this embodiment, although the open and close timings of the intake and exhaust valves 11 and 12 (valve timings) and the opening of the EGR valve 53 (EGR valve opening) are defined on the maps, the EGR rate may vary due to various factors, such as a response delay, even if the valve timings and the EGR valve opening are controlled as the settings of the maps. Moreover, the variation in the EGR rate leads to a variation in the in-cylinder temperature near a compression top dead center, together with other factors, such as the ambient temperature. Therefore, the combustion controlling module 102 estimates the actual EGR rate inside the combustion chamber 6 (external EGR rate and internal EGR rate) at a close timing of the intake valve 11 (IVC timing), and the in-cylinder temperature near a compression top dead center immediately after the IVC based on the detection values from the various sensors, such as the airflow sensor SN3, the intake air temperature sensor SN4, and the intake air pressure sensor SN5 (intake air flow rate, intake air temperature, intake pressure, etc.), the settings of the valve timings and the EGR valve opening, and the given model formula determined beforehand. The model formula is a model formula in which, for example, the latest histories of parameters, such as the intake air flow rate, the intake air temperature, the intake pressure, the valve timings, and the EGR valve opening, are used as input elements, and is set so as to estimate the actual external EGR rate and the actual internal EGR rate at the IVC timing which reflect the response delay, and the in-cylinder temperature near the compression top dead center.

Next, the combustion controlling module 102 shifts to Step S25, where it determines the timing of the main ignition Sa based on the EGR rate and the in-cylinder temperature estimated at Step S24. In detail, the combustion controlling module 102 determines, by using the model formula defined beforehand, the timing of the main ignition Sa so that the target SI ratio and the target θci described above are achieved. The model formula is a model formula which uses a plurality of parameters including the estimated EGR rate (the external EGR rate and the internal EGR rate) and the in-cylinder temperature as the input elements, and it is set to calculate the timing of the main ignition Sa so that the SI ratio and θci when the SPCCI combustion of mixture gas is carried out matches with the target SI ratio and the target θci as much as possible. According to this model formula, the timing of the main ignition Sa is calculated to be at a more retarded side as a condition determined by a combination of the estimated EGR rate and in-cylinder temperature becomes easier to ignite the mixture gas, and conversely, it is calculated at a more advanced side as the condition becomes more difficult to ignite the mixture gas, within a given crank angle range near the compression top dead center.

Next, the combustion controlling module 102 shifts to Step S26, where it causes the injector 15 to inject fuel, and causes the ignition plug 16 to perform the preceding ignition Sb and the main ignition Sa. That is, the combustion controlling module 102 controls the injector 15 so that fuel is injected according to the fuel injection pattern determined at any one of Steps S12, S16, and S19, and the injection amount and the injection timing of the plurality of fuel injections (Fa1 to Fa3, etc.) included in the injection pattern matches with the injection amount and the injection timing determined at any one of Steps S13, S17, and S20. It also controls the ignition plug 16 so that the preceding ignition Sb is performed at the timing determined at Step S23, and the main ignition Sa is performed at the timing determined at Step S25.

Figure 10:
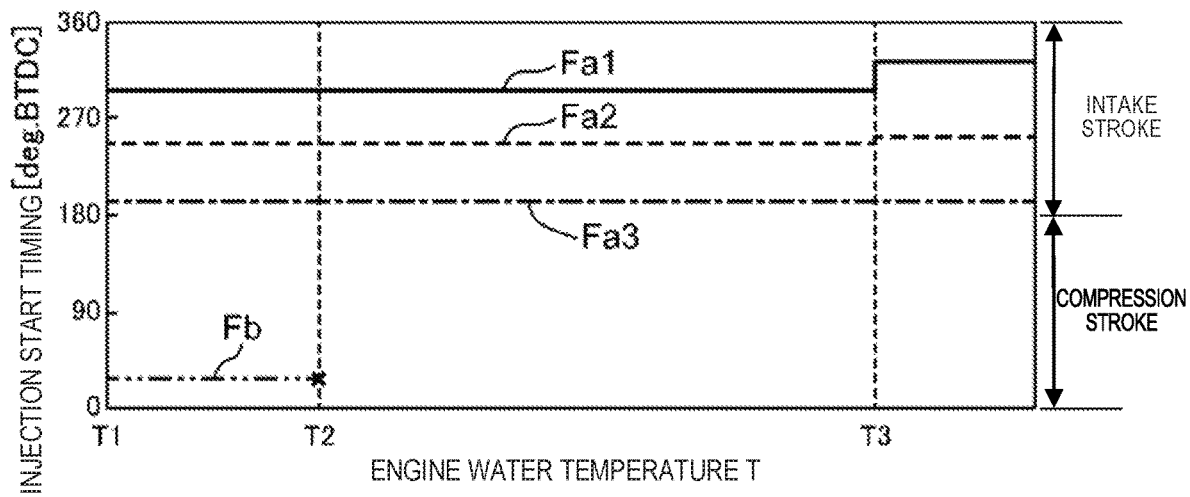
FIG. 10 is a graph illustrating a relationship between the engine water temperature and the injection start timing of fuel.
Figure 11:
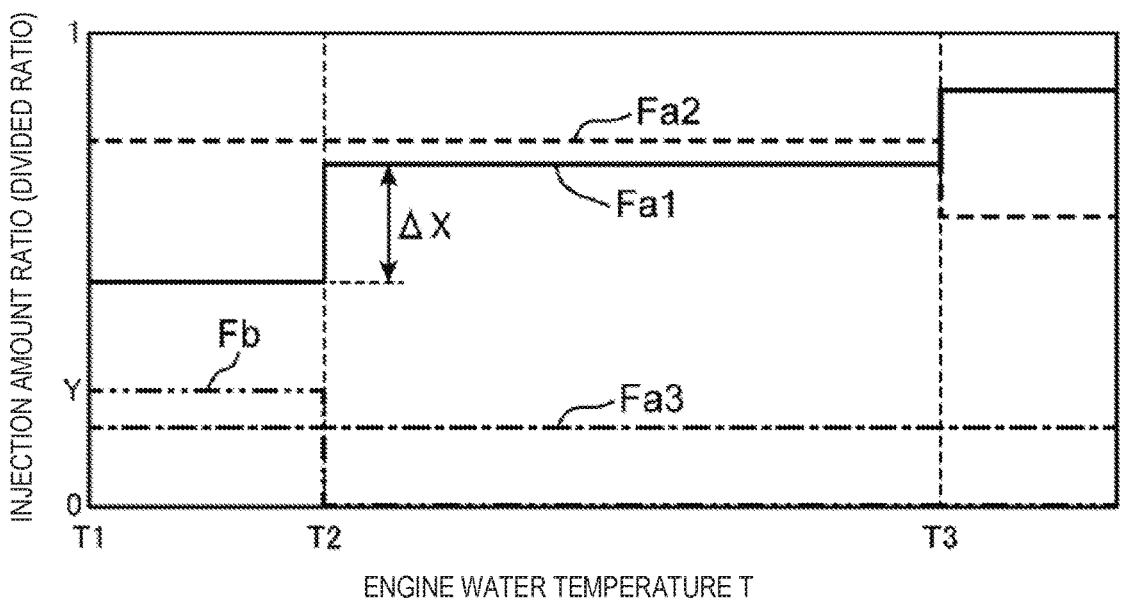
FIG. 11 is a graph illustrating a relationship between the engine water temperature and an injection amount ratio (divided ratio) of fuel.

FIG. 10 is a graph illustrating a relationship between the engine water temperature T and the injection start timing of fuel, and FIG. 11 is a graph illustrating a relationship between the engine water temperature T and the injection amount ratio (divided ratio) of fuel. The injection timing and the injection amount ratio illustrated in both graphs are for a certain specific operation point in the first operating range A1. That is, both graphs illustrate changes in the injection timing and the injection amount ratio when changing only the engine water temperature, while fixing the condition of the engine load and the engine speed.

As already described, when the engine water temperature T is the first threshold T1 (70° C.) or higher, the three fuel injections (the first to third early injections Fa1-Fa3) are performed during an intake stroke. Moreover, only when the engine water temperature T is the first threshold T1 or higher and lower than the second threshold T2 (90° C.), one retarded injection Fb is performed in the second half of a compression stroke (in detail, the late period of the compression stroke). Thus, since the first to third early injections Fa1-Fa3 are certainly performed in the temperature range of T1 or higher, and the retarded injection Fb is only performed in the temperature range from T1 to T2 (i.e., the first lean combustion condition), the diagram of the retarded injection Fb is only illustrated within the temperature range from T1 to T2 in FIG. 10. Moreover, in FIG. 11, the suspension of the retarded injection Fb in the temperature range of T2 or higher is expressed by a zero-injection amount ratio (a value of the vertical axis) of the retarded injection Fb.

As illustrated in FIG. 10, even if the engine water temperature T varies within a range of the first threshold T1 or higher (i.e., any of the first, second, and third lean combustion conditions is satisfied), the start timing of the first early injection Fa1 is set to the early period of an intake stroke, the start timing of the second early injection Fa2 is set to the middle period of the intake stroke, and the start timing of the third early injection Fa3 is set to the late period of the intake stroke. Note that the start timing of the first early injection Fa1 is constant in the range of the first threshold T1 or higher and lower than the third threshold T3 (70° C. to 116° C.), but, when it comes into the range of the third threshold T3 (116° C.) or higher, it is further advanced within the early period of the intake stroke. Moreover, the start timing of the second early injection Fa2 is also advanced slightly in the third threshold T3 or higher. In other words, when the third lean combustion condition is satisfied, the fuel injection timings of the first early injection Fa1 and the second early injection Fa2 are set at the advanced side, compared with the first or second lean combustion condition.

As illustrated in FIG. 11, in the range of the first threshold T1 or higher and lower than the second threshold T2 (70° C. to 90° C.), i.e., in the temperature range corresponding to the first lean combustion condition, the injection amount ratio of fuel is set so that the third early injection Fa3, the retarded injection Fb, the first early injection Fa1, and the second early injection Fa2 become larger in this order. In other words, when the first lean combustion condition is satisfied, the divided ratio of the fuel injections (Fa1, Fa2, Fa3, and Fb) is set so that the injection amount of the retarded injection Fb becomes more than the injection amount of the third early injection Fa3, the injection amount of the first early injection Fa1 becomes larger than the injection amount of the retarded injection Fb, and the injection amount of the second early injection Fa2 becomes larger than the injection amount of the first early injection Fa1.

In the range of the second threshold T2 or higher and lower than the third threshold T3 (90° C. to 116° C.), i.e., in the temperature range corresponding to the second lean combustion condition, the retarded injection Fb is suspended, and the injection amount ratio of the first early injection Fa1 is increased by an incremental amount ΔX compared with the case when the first lean combustion condition is satisfied (temperature range from T1 to T2). The incremental amount ΔX of the first early injection Fa1 is set substantially identical to an injection amount Y of the retarded injection Fb during the first lean combustion condition. Note that the magnitude correlation of the injection amount ratio of the first to third early injections Fa1, Fa2, and Fa3 does not change, and therefore, the relationship of the injection amount ratio which becomes larger in the order of the third early injection Fa3, the first early injection Fa1, and the second early injection Fa2 is also maintained for the second lean combustion condition.

In the range of the third threshold T3 (116° C.) or higher, i.e., in the temperature range corresponding to the third lean combustion condition, the injection amount ratio of the first early injection Fa1 is increased and the injection amount ratio of the second early injection Fa2 is reduced, compared with the case when the second lean combustion condition is satisfied (temperature range from T2 to T3). The incremental amount of the injection amount ratio of the first early injection Fa1 and the decremental amount of the injection amount ratio of the second early injection Fa2 are set identical to each other. The magnitude correlation of the injection amount ratios between the first and second early injections Fa1 and Fa2 is reversed, and the injection amount ratio of the first early injection Fa1 becomes larger than the injection amount ratio of the second early injection Fa2. That is, when the third lean combustion condition is satisfied, the divided ratio of the fuel injections (Fa1, Fa2, and Fa3) is set so that the injection amount of the second early injection Fa2 becomes more than the injection amount of the third early injection Fa3, and the injection amount of the first early injection Fa1 becomes more than the injection amount of the second early injection Fa2.

(5) Operation and Effects

As described above, in this embodiment, when the engine is operated in the first operating range A1 where the engine load is low, each part, such as the injector 15 and the ignition plug 16, is controlled so that SPCCI combustion of the mixture gas is carried out under the A/F lean environment where the air-fuel ratio inside the combustion chamber 6 becomes larger than a stoichiometric air-fuel ratio, and the mode of the fuel injection by the injector 15 in the first operating range A1 is variably set according to the engine water temperature T. In detail, when the first lean combustion condition in which the engine is operated in the first operating range A1, and the engine water temperature T is the first threshold T1 or higher and lower than the second threshold T2 (70° C. to 90° C.) is satisfied, the early injection Fa in which fuel is injected during an intake stroke (the first to third early injections Fa1-Fa3), and the retarded injection Fb in which fuel is injected during the second half of a compression stroke are performed by the injector 15. On the other hand, when the second lean combustion condition in which the engine is operated in the first operating range A1, and the engine water temperature T is the second threshold T2 or higher and lower than the third threshold T3 (90° C. to 116° C.) is satisfied, the injector 15 is controlled so that the injection amount ratio of the early injection Fa increases and the injection amount ratio of the retarded injection Fb decreases, compared with the case when the first lean combustion condition is satisfied. According to such a configuration, there is an advantage that both the improvement in fuel efficiency by making the air-fuel ratio leaner, and securing combustion stability are achieved.

That is, in this embodiment, when the first lean combustion condition is satisfied, i.e., when the A/F-lean SPCCI combustion is performed in the situation where the engine water temperature T is relatively low and the engine load is low, since the retarded injection Fb in the second half of a compression stroke is performed in addition to the early injection Fa in an intake stroke, the stratified mixture gas can be formed inside the combustion chamber 6 so that the mixture gas around the ignition plug 16 becomes relatively rich, and the generation of the flame propagation accompanying the jump-spark ignition of the ignition plug 16 (SI combustion) can be stimulated, thereby stabilizing the SPCCI combustion. In addition, since a comparatively large amount of air is introduced into the combustion chamber 6 in order to make the inside of the combustion chamber 6 into A/F lean environment, even if the relatively rich mixture gas is formed around the ignition plug 16 as described above, the air utilization when the rich mixture gas combusts does not drop greatly, thereby preventing the increase in the unburnt component of fuel. Therefore, the fuel efficiency improvement amount caused by making the air-fuel ratio leaner (a drop of the combustion temperature and a drop of the pumping loss caused by this lean air-fuel ratio) exceeds the fuel efficiency degradation amount caused by increasing the unburnt component, thereby substantially improving fuel efficiency, for example, compared with the case where SPCCI combustion of the mixture gas is carried out under the stoichiometric environment where the air-fuel ratio inside the combustion chamber 6 is made near the stoichiometric air-fuel ratio. In other words, the first threshold T1 (in this embodiment, 70° C.) which is the lower-limit temperature above which the A/F-lean SPCCI combustion is permitted in the first operating range A1 is set to a temperature so that the effect of substantially improving fuel efficiency can be acquired, even if the negative aspect of the retarded injection Fb is deducted.

On the other hand, when the second lean combustion condition is satisfied, i.e., when the A/F-lean SPCCI combustion is performed in the situation where the engine water temperature T is relatively high and the engine load is low, since the injection amount ratio of the early injection Fa is increased and the injection amount ratio of the retarded injection Fb is reduced, an unnecessary retarded injection Fb can be avoided from being performed under the situation where the engine water temperature T is high and the ignitability of the mixture gas is improved, and the stratification of the mixture gas can be weakened while securing the combustion stability (it can bring the mixture gas close to homogeneous). Therefore, the clean combustion in which the amount of NOR, etc. is fully reduced can be achieved, while reducing the unburnt component of fuel to effectively improve fuel efficiency.

In particular, in this embodiment, since the injection amount of the retarded injection Fb is reduced to zero (i.e., the retarded injection Fb is suspended) when the second lean combustion condition is satisfied, the unburnt component of fuel can fully be reduced and fuel efficiency can be further improved.

Moreover, in this embodiment, since the fuel pressure regulator 17 is controlled so that the injection pressure by the injector 15 becomes higher when the first lean combustion condition is satisfied than when the second lean combustion condition is satisfied, the fuel injected by the retarded injection Fb can fully be atomized during the SPCCI combustion under the first lean combustion condition at the relatively low-temperature side, and the air utilization can be improved, while stimulating the stratification of the mixture gas. Therefore, since the relatively rich mixture gas can be formed around the ignition plug 16 and the generation of the unburnt component can be reduced, both securing combustion stability and the improvement in fuel efficiency can be achieved.

Moreover, in this embodiment, when either one of the first lean combustion condition and the second lean combustion condition is satisfied, since the early injection Fa is divided into a plurality of times (3 times), that is, three fuel injections comprised of the first to third early injections Fa1-Fa3 are performed as the early injection Fa, the distribution of the mixture gas inside the combustion chamber 6 based on the early injection Fa (Fa1, Fa2, and Fa3) can be weakly stratified which is suitable for the SPCCI combustion. Moreover, when the first lean combustion condition is satisfied, the fully stratified mixture gas suitable for the SPCCI combustion under the comparatively low-temperature environment can be formed by the combination of the early injection Fa (Fa1, Fa2, and Fa3) which are divided into three portions, and the retarded injection Fb.

In addition, in this embodiment, since the injection amount ratio of the first early injection Fa1 which is the first fuel injection of the early injection Fa is variable according to the temperature condition, and the injection amount ratio of the first early injection Fa1 is increased when the second lean combustion condition is satisfied more than when the first lean combustion condition is satisfied, the injection amount ratio can be adjusted so that the distribution of the mixture gas becomes more uniform during the SPCCI combustion under the second lean combustion condition at the relatively high temperature side, thereby improving fuel efficiency while securing combustion stability.

Moreover, in this embodiment, when performing the A/F-lean SPCCI combustion under the condition of a further higher temperature than the second lean combustion condition, that is, when the third lean combustion condition in which the engine is operated in the first operating range A1, and the engine water temperature T is the third threshold T3 or higher is satisfied, since the injector 15 is controlled so that the early injection Fa is performed in the plurality of steps (the 3 injections of Fa1, Fa2, and Fa3) and the retarded injection Fb is suspended, the stratification of the mixture gas can be weakened to reduce the generation of the unburnt component, thereby achieving the SPCCI combustion which is clean and high in fuel efficiency, similar to the case of the second lean combustion condition.

Especially when the third lean combustion condition is satisfied, since the injection amount ratio of the first early injection Fa1 which is the first fuel injection of the early injection Fa is increased and the fuel injection timing of the first early injection Fa1 is advanced, compared with the case when the second lean combustion condition is satisfied, the injection amount ratio and the fuel injection timing can be adjusted so that the distribution of the mixture gas becomes more uniform under the third lean combustion condition where combustion stability is appropriate because the engine water temperature T is sufficiently high, thereby further improving fuel efficiency, while securing combustion stability.

Moreover, in this embodiment, when any of the first lean combustion condition and the second lean combustion condition is satisfied, since the preceding ignition Sb which generates sparks of low energy which does not cause flame is performed before the main ignition Sa near a compression top dead center (here, between the first early injection Fa1 and the second early injection Fa2), the fuel can be appropriately modified by the preceding ignition Sb to generate inside the combustion chamber 6 the intermediate product which is high in reactability and contains OH radicals, thereby improving the ignitability and speeding up the combusting rate of the mixture gas. Therefore, since it becomes unnecessary to extremely stratify the mixture gas distribution inside the combustion chamber 6 for securing combustion stability especially under the first lean combustion condition at the low-temperature side, the injection amount ratio of the retarded injection Fb can be reduced, and the increase in the unburnt component resulting from the mixture gas becoming locally rich can be effectively reduced. Moreover, since the second threshold T2 which is the upper-limit temperature of the first lean combustion condition where the retarded injection Fb is essential can be made a comparatively low value, the temperature condition belonging to the second lean combustion condition where the retarded injection Fb is not essential, i.e., the temperature condition where the clean SPCCI combustion is possible with high fuel efficiency can be expanded, thereby effectively improving fuel efficiency and emission performance of the engine.

Note that although in this embodiment the preceding ignition Sb is performed also under the third lean combustion condition at the highest temperature side, the timing of the preceding ignition Sb is largely retarded up to immediately before the main ignition Sa (the second half of a compression stroke) during the third lean combustion condition (Chart (c) of FIG. 9), unlike the first and second lean combustion conditions described above. This is because combustion stability is appropriate under the third lean combustion condition where the engine water temperature T is sufficiently high, and therefore, the necessity of modifying the fuel is low. Rather, under the third lean combustion condition, since the period from the preceding ignition Sb to the main ignition Sa is significantly shortened, such an effect as if the generation period of sparks is extended can be acquired, and, as a result, sufficient combustion stability can be secured even if the modification effect of the fuel is small.

(6) Modifications

Although in the above embodiment the retarded injection Fb in which fuel is injected during the second half of a compression stroke is performed only when the first lean combustion condition is satisfied, the retarded injection may also be perform when the second lean combustion condition is satisfied, in addition to the first lean combustion condition. However, when performing the retarded injection also when the second lean combustion condition is satisfied, its injection amount ratio should be lower than the injection amount ratio of the retarded injection when the first lean combustion condition is satisfied.

Although in the above embodiment the early injection Fa (the first to third early injections Fa1-Fa3) during an intake stroke and the retarded injection Fb in the second half of a compression stroke are performed when the first lean combustion condition is satisfied, other fuel injections may be performed between the early injection Fa and the retarded injection Fb (e.g., the first half of the compression stroke). Similarly, fuel injections other than the early injection Fa may be performed in the first half of the compression stroke also when the second lean combustion condition and the third lean combustion condition are satisfied.

Although, in the above embodiment, when any of the first to third lean combustion conditions is satisfied, the early injection Fa is performed dividedly in 3 steps, i.e., the three fuel injections comprised of the first to third early injections Fa1-Fa3 are performed as the early injection Fa, the number of early injections Fa is not limited to 3, and it may be 1 or 2, or may be 4 or more. Moreover, the number of early injections Fa may be set variably according to which lean combustion condition among the first to third lean combustion condition is satisfied.

Although in the above embodiment it is determined that each of the first to third lean combustion conditions is satisfied based on the engine load and the engine speed, and the engine water temperature (coolant temperature of the engine) detected by the water temperature sensor SN2, the temperature parameter used as a reference of the determination may be a parameter which changes according to the progress of a warm-up of the engine, and may be, for example, the temperature of engine oil (oil temperature).

It should be understood that the embodiments herein are illustrative and not restrictive, since the scope of the invention is defined by the appended claims rather than by the description preceding them, and all changes that fall within metes and bounds of the claims, or equivalence of such metes and bounds thereof, are therefore intended to be embraced by the claims.

DESCRIPTION OF REFERENCE CHARACTERS

6 Combustion Chamber
15 Injector
16 Ignition Plug
17 Fuel Pressure Regulator
32 Throttle Valve (Air Amount Adjusting Mechanism)
102 Combustion Controlling Module
A1 First Operating Range (Low-load Range)
Fa (Fa1-Fa3) Early Injection
Fb Retarded Injection
Sa Main Ignition
Sb Preceding Ignition
SN2 Water Temperature Sensor
T1 First Threshold
T2 Second Threshold (Given Value)
T3 Third Threshold

What is claimed is:

1. A control device for an engine including a combustion chamber, an injector configured to inject fuel into the combustion chamber, and an ignition plug configured to ignite a mixture gas where the fuel injected from the injector is mixed with air, the control device comprising:
an air amount adjusting mechanism, including at least a throttle valve, configured to adjust an amount of air introduced into the combustion chamber;
a water temperature sensor configured to acquire a given temperature parameter that increases as a warm-up of the engine progresses; and
a processor configured to execute a combustion controlling module to control the injector, the ignition plug, and the air amount adjusting mechanism based on the temperature parameter acquired by the water temperature sensor, and an engine load and an engine speed so that partial compression ignition combustion is carried out in which spark ignition (SI) combustion of a portion of the mixture gas is performed by a jump-spark ignition using the ignition plug, and compression ignition (CI) combustion of the remaining mixture gas is performed by a self-ignition,
wherein when a first lean combustion condition in which the engine is operated in a low-load range where the engine load is low and the temperature parameter is below a given value determined beforehand is satisfied, the combustion controlling module causes the injector to perform an early injection in which fuel is injected during an intake stroke, and a retarded injection in which fuel is injected during the second half of a compression stroke, and controls the air amount adjusting mechanism and the ignition plug so that an air-fuel ratio (A/F)-lean mixture gas having an air-fuel ratio greater than a stoichiometric air-fuel ratio is formed inside the combustion chamber, and partial compression ignition combustion of the mixture gas is carried out, and wherein when a second lean combustion condition in which the engine is operated in the low-load range and the temperature parameter is the given value or above is satisfied, the combustion controlling module controls the injector so that an injection amount ratio of the early injection increases and the injection amount ratio of the retarded injection decreases, compared with the case when the first lean combustion condition is satisfied, and controls the air amount adjusting mechanism and the ignition plug so that the A/F-lean mixture gas is formed inside the combustion chamber and partial compression ignition combustion of the mixture gas is carried out.

2. The control device of claim 1, wherein the combustion controlling module controls the injector so that an injection amount by the retarded injection becomes zero when the second lean combustion condition is satisfied.

3. The control device of claim 1, further comprising a fuel pressure regulator configured to adjust an injection pressure of fuel from the injector, wherein the combustion controlling module controls the fuel pressure regulator so that the injection pressure of the injector when the first lean combustion condition is satisfied becomes higher than the injection pressure when the second lean combustion condition is satisfied.

4. The control device of claim 1, wherein the combustion controlling module controls the injector so that the early injection is performed dividedly in a plurality of steps when the first lean combustion condition is satisfied and when the second lean combustion condition is satisfied.

5. The control device of claim 4, wherein when the second lean combustion condition is satisfied, the combustion controlling module controls the injector so that the injection amount ratio of a first fuel injection of the early injection increases and the injection amount ratio of the retarded injection decreases, compared with the case when the first lean combustion condition is satisfied.

6. The control device of claim 5, wherein the first lean combustion condition is a condition in which the engine is operated in the low-load range, and the temperature parameter is greater than or equal to a first threshold and less than a second threshold, wherein the second lean combustion condition is a condition in which the engine is operated in the low-load range, and the temperature parameter is greater than or equal to the second threshold and less than a third threshold, wherein when a third lean combustion condition in which the engine is operated in the low-load range, and the temperature parameter is greater than or equal to the third threshold is satisfied, the combustion controlling module controls the injector so that the early injection is performed dividedly in a plurality of steps and the retarded injection is suspended, and controls the air amount adjusting mechanism and the ignition plug so that the A/F-lean mixture gas is formed inside the combustion chamber and partial compression ignition combustion of the mixture gas is carried out, and wherein when the third lean combustion condition is satisfied, the combustion controlling module increases the injection amount ratio of the first fuel injection of the early injection, and advances an injection timing of the first fuel injection, compared with when the second lean combustion condition is satisfied.

7. The control device of claim 1, wherein when the first lean combustion condition is satisfied, and when the second lean combustion condition is satisfied, the combustion controlling module causes the ignition plug to perform a main ignition in which a spark is generated near a compression top dead center to start the SI combustion and a preceding ignition in which a spark is generated at a timing earlier than the main ignition, and wherein energy of the preceding ignition is set lower so that flame propagation of the mixture gas does not occur, and the energy of the main ignition is set higher so that the flame propagation of the mixture gas does occur.

* * * * *